United States Patent
Sutardja

(10) Patent No.: US 8,683,080 B2
(45) Date of Patent: Mar. 25, 2014

(54) NETWORK SYSTEM FOR DISTRIBUTING PROTECTED CONTENT

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 1824 days.

(21) Appl. No.: 11/700,802

(22) Filed: Jan. 31, 2007

(65) Prior Publication Data

US 2007/0136440 A1 Jun. 14, 2007

Related U.S. Application Data

(63) Continuation-in-part of application No. 11/384,571, filed on Mar. 20, 2006, which is a continuation-in-part of application No. 11/085,761, filed on Mar. 21, 2005.

(60) Provisional application No. 60/884,757, filed on Jan. 12, 2007.

(51) Int. Cl.
G06F 15/16 (2006.01)

(52) U.S. Cl.
USPC .......................................... 709/250

(58) Field of Classification Search
USPC .......................................... 709/250
See application file for complete search history.

(56) References Cited

U.S. PATENT DOCUMENTS

| | | | |
|---|---|---|---|
| 6,678,226 B2 | 1/2004 | Horibata et al. | |
| 6,834,110 B1 * | 12/2004 | Marconcini et al. | 380/239 |
| 2002/0049717 A1 * | 4/2002 | Routtenberg et al. | 707/1 |
| 2002/0099950 A1 | 7/2002 | Smith | |
| 2002/0103964 A1 | 8/2002 | Igari | |
| 2004/0117440 A1 | 6/2004 | Singer | |
| 2004/0213273 A1 | 10/2004 | Ma | |
| 2004/0213408 A1 | 10/2004 | Kim et al. | |
| 2006/0095331 A1 * | 5/2006 | O'Malley et al. | 705/22 |
| 2007/0136440 A1 * | 6/2007 | Sutardja | 709/217 |

(Continued)

FOREIGN PATENT DOCUMENTS

| | | |
|---|---|---|
| EP | 1 187 391 | 3/2002 |
| EP | 1 408 497 | 4/2004 |
| EP | 1 439 697 A | 7/2004 |
| WO | WO 03/075570 A1 | 9/2003 |

OTHER PUBLICATIONS

U.S. Appl. No. 11/039,288, filed Jan. 19, 2005, Sehat Sutardja.
U.S. Appl. No. 11/085,761, filed Mar. 21, 2005, Sehat Sutardja.

(Continued)

*Primary Examiner* — Krista Zele
*Assistant Examiner* — Arvin Eskandarnia

(57) ABSTRACT

A network device includes a content requesting interface for adding desired selected content to a queue associated with a remote content provider. Memory stores received selected content that is received from the remote content provider. A network interface provides at least one of usage and storage status data relating to the received selected content stored in the memory to the remote content provider, receives additional ones of the desired selected content in the queue from the remote content provider based on the at least one of the usage and the storage status data of the received selected content in the memory, and stores the desired selected content received from the remote content provider as the received selected content in the memory. The storage status includes at least one of a hidden status, an erased status, and an amount of the received selected content stored in the memory.

53 Claims, 28 Drawing Sheets

(56) References Cited

U.S. PATENT DOCUMENTS

| | | | |
|---|---|---|---|
| 2007/0162573 A1* | 7/2007 | Sutardja | 709/219 |
| 2007/0198689 A1* | 8/2007 | Sutardja | 709/223 |
| 2009/0006418 A1* | 1/2009 | O'Malley | 707/10 |

OTHER PUBLICATIONS

U.S. Appl. No. 11/174,176, filed Jul. 1, 2005, Sehat Sutardja.
U.S. Appl. No. 11/174,276, filed Jul. 1, 2005, Sehat Sutardja.
U.S. Appl. No. 11/384,571, filed Mar. 20, 2006, Sehat Sutardja.
U.S. Appl. No. 11/725,361, filed Mar. 19, 2007, Sehat Sutardja.
U.S. Appl. No. 11/725,387, filed Mar. 19, 2007, Sehat Sutardja.
U.S. Appl. No. 11/039,288, filed Jan. 19, 2005, Sutardja, Sehat.
Rallu, F. et al, "Acid- and Multistress-Resistant Mutants of Lactococcus Lactis:—Identification of Intracellular Stress Signals," Molecular Microbiology, 2000, pp. 517-528.
Written Opinion and Search Report from the Intellectual Property Office of Singapore dated Mar. 22, 2007 for Application No. SG 200600827-0; 10 pages.
Written Opinion and Search Report from the Intellectual Property Office of Singapore dated Mar. 2007 for Application No. SG 200600824-7; 8 pages.
Written Opinion and Search Report from the Intellectual Property Office of Singapore dated Mar. 16, 2007 for Application No. SG 200600826-2; 9 pages.
Written Opinion of the International Searching Authority dated Jul. 17, 2006 for International Application No. PCT/US2006/010474; 5 pages.
Notication of Transmittal of the International Search Report dated Jul. 17, 2006 for International Application No. PCT/US2006/010474; 6 pages.
Communication from the European Patent Office dated Apr. 6, 2006 for Application No. 06002269.6.
Communication from the European Patent Office dated Apr. 6, 2006 for Application No. 06002265.4.
Communication from the European Patent Office dated Apr. 6, 2006 for Application No. 06002246.4.
PCT Notification of Transmittal of the International Search Report and the Written Opinion of the International Searching Authority dated Sep. 19, 2007 for Application No. PCT/US2007/006906; 12 pages.
First Official Communication from the European Patent Office dated May 29, 2007 for Application No. 06 002 246.4-1245; 9 pages.
First Official Communication from the European Patent Office dated May 29, 2007 for Application No. 06 002 269.6-1245; 8 pages.
First Official Communication from the European Patent Office dated May 29, 2007 for Application No. 06 002 265.4-1245; 8 pages.
Corrected Version of the Written Opinion from the Intellectual Property Office of Singapore dated Mar. 16, 2007 for Application No. SG 200600824-7; 4 pages.

* cited by examiner

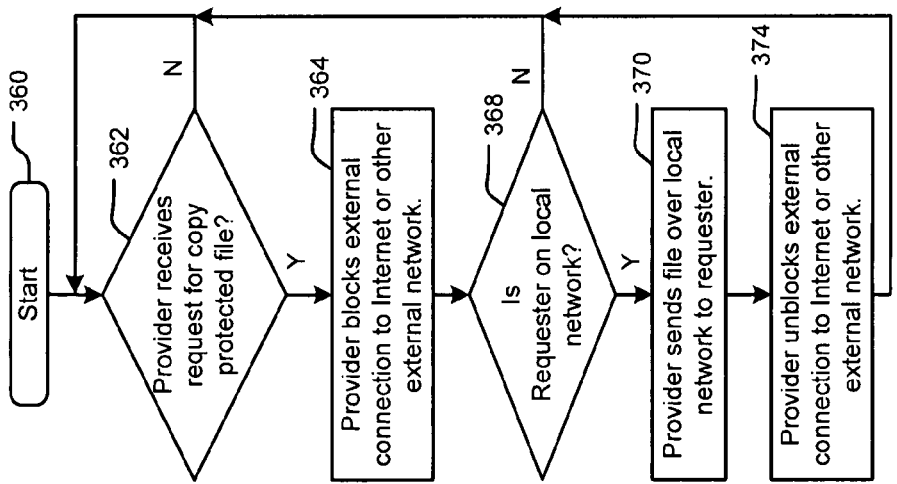
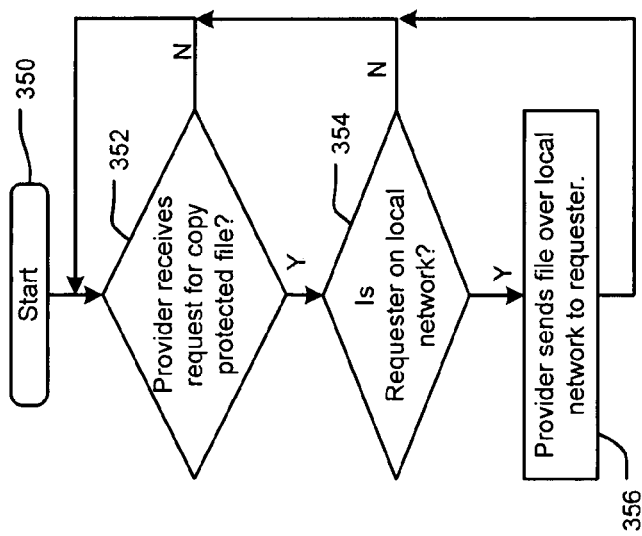
FIG. 9B
FIG. 9A

NETWORK SYSTEM FOR DISTRIBUTING PROTECTED CONTENT

CROSS-REFERENCE TO RELATED APPLICATIONS

This application claims the benefit of U.S. Provisional Application No. 60/884,757, filed on Jan. 12, 2007, and is a continuation-in-part of U.S. patent application Ser. No. 11/384,571 filed on Mar. 20, 2006, which is a continuation-in-part of U.S. patent application Ser. No. 11/085,761 filed on Mar. 21, 2005. This application is related to U.S. patent application Ser. No. 11/039,288 filed on Jan. 20, 2005. The disclosures of the above applications are incorporated herein by reference in their entirety.

FIELD OF THE INVENTION

The present invention relates to networks, and more particularly to network systems that allow secure distribution of protected content.

BACKGROUND OF THE INVENTION

Consumers often purchase video content on digital versatile discs (DVDs). A DVD player may be used to output the video content to a television (TV) or other video monitor. Some DVD players may include a carousel for allowing selection and play of one of a plurality of DVDs. In some situations, a consumer may want to view the DVD content on a first TV in one room of the consumer's home when the DVD player is located and connected to a second TV in another room. As a result, the DVD player needs to be disconnected from the second TV, moved to the room with the first TV and reconnected to the first TV. Alternately, if the consumer has a second DVD player, the consumer moves the DVD to the other player.

One possible solution to this problem involves copying the DVD content onto another DVD. DVD players typically include only one DVD player, which makes copying DVDs difficult. To copy the DVD, the user must copy the DVD contents to a hard drive system. Typically, copy protection schemes such as digital rights management (DRM) prevent such copying despite the fact that some copying may be allowed under the copyright laws. This is due, in part, to the fact that the data is decrypted and/or decoded by the DVD player and is therefore in an unprotected form when it is output to other devices. This solution also requires an additional DVD player.

SUMMARY OF THE INVENTION

A network device includes a content requesting interface for adding desired selected content to a queue associated with a remote content provider. Memory stores received selected content that is received from the remote content provider. A network interface provides at least one of usage and storage status data relating to the received selected content stored in the memory to the remote content provider, receives additional ones of the desired selected content in the queue from the remote content provider based on the at least one of the usage and the storage status data of the received selected content in the memory, and stores the desired selected content received from the remote content provider as the received selected content in the memory. The storage status includes at least one of a hidden status, an erased status, and an amount of the received selected content stored in the memory.

In other features, the network interface receives the additional ones of the desired selected content asynchronously with respect to a user request. A system includes the network device and further includes at least one of the queue and the remote content provider. The received selected content is stored in a hidden section of the memory and the received selected content becomes accessible to a user based on at least one of a sequence of the desired selected content in the queue and the at least one of the usage and the storage status data.

In other features, the received selected content stored in the hidden section of the memory has the hidden status. The status of the received selected content includes a period of time that the received selected content is stored in the memory. The network interface receives the desired selected content when the received selected content is erased from the memory. A user at least one of views the desired selected content, deletes the desired selected content, and modifies a sequence of the desired selected content in the queue using the content requesting interface.

In other features, the received selected content is at least one of erased from the memory and moved to a hidden section of the memory after at least one of a predetermined period and a predetermined number of viewings. At least one of the network device and the remote content provider automatically erases the received selected content. The network interface receives the desired selected content when a user indicates that the received selected content is erased. The remote content provider determines whether the received selected content is erased. The remote content provider periodically searches the memory to determine whether the received selected content is erased.

In other features, the received selected content is transferable to a removable storage medium based on an agreement between a user and the remote content provider. An Internet website implements the content requesting interface. A system includes the network device and further includes an optical data storage system. A system includes the network device and further includes at least one of a hard disk drive (HDD) system and a solid-state memory device.

A network device includes content requesting interface means for adding desired selected content to a queue associated with a remote content provider, memory means for storing received selected content that is received from the remote content provider, and network interface means for providing at least one of usage and storage status data relating to the received selected content stored in the memory means to the remote content provider, for receiving additional ones of the desired selected content in the queue from the remote content provider based on the at least one of the usage and the storage status data of the received selected content in the memory means, and for storing the desired selected content received from the remote content provider as the received selected content in the memory means. The storage status includes at least one of a hidden status, an erased status, and an amount of the received selected content stored in the memory means.

In other features, the network interface means receives the additional ones of the desired selected content asynchronously with respect to a user request. A system includes the network device and further includes at least one of the queue and the remote content provider. The received selected content is stored in a hidden section of the memory means and the received selected content becomes accessible to a user based on at least one of a sequence of the desired selected content in the queue and the at least one of the usage and the storage status data.

In other features, the received selected content stored in the hidden section of the memory has the hidden status. The status of the received selected content includes a period of time that the received selected content is stored in the memory means. The network interface means receives the desired selected content when the received selected content is erased from the memory means. A user at least one of views the desired selected content, deletes the desired selected content, and modifies a sequence of the desired selected content in the queue using the content requesting interface means.

In other features, the received selected content is at least one of erased from the memory means and moved to a hidden section of the memory means after at least one of a predetermined period and a predetermined number of viewings. At least one of the network device and the remote content provider automatically erases the received selected content. The network interface means receives the desired selected content when a user indicates that the received selected content is erased. The remote content provider determines whether the received selected content is erased. The remote content provider periodically searches the memory means to determine whether the received selected content is erased.

In other features, the received selected content is transferable to a removable storage medium based on an agreement between a user and the remote content provider. An Internet website implements the content requesting interface means. A system includes the network device and further includes an optical data storage system. A system includes the network device and further includes at least one of a hard disk drive (HDD) system and a solid-state memory device.

A system for delivering content to a network device includes a content requesting interface, wherein a user selects desired content from available content using the content requesting interface. A queue stores identifiers of the desired selected content. A remote content provider is remote from the network device, communicates with the queue, and transmits the desired selected content to the network device based on a sequence of the identifiers of the desired selected content stored in the queue and on at least one of usage and storage status data associated with received selected content stored on the network device. The storage status includes at least one of a hidden status, an erased status, and an amount of the received selected content stored in the memory.

In other features, the network device receives the desired selected content asynchronously with respect to a user request. The remote content provider transmits the desired selected content to the network device when the user selects the desired selected content, the network device stores the desired selected content as the received selected content in a hidden section of the network device, and the received selected content becomes accessible to the user based on the at least one of the usage and the storage status data.

In other features, the received selected content stored in the hidden section of the memory has the hidden status. The storage status includes a period of time that the received selected content is stored on the network device. The remote content provider transmits the desired selected content when the received selected content is erased from the network device. The user at least one of views the desired selected content, deletes the desired selected content, and modifies a sequence of the desired selected content in the queue using the content requesting interface. The received selected content is at least one of erased from the network device and moved to a hidden section of the network device after at least one of a period of time and a selected number of viewings. At least one of the network device and the remote content provider automatically erases the received selected content.

In other features, the remote content provider transmits the desired selected content when the user indicates that the received selected content is erased. The remote content provider determines whether the received selected content is erased. The remote content provider periodically searches the network device to determine whether the received selected content is erased. The received selected content is transferable to a removable storage medium based on an agreement between the user and the remote content provider. An Internet website implements the content requesting interface. The network device includes an optical data storage system. The network device includes at least one of a hard disk drive (HDD) system and a solid-state memory device.

A system for delivering content to a network device includes content requesting interface means for providing access to a user and for selecting desired content from available content, queue means for storing identifiers of the desired selected content, and remote content provider means for communicating with the queue means and for transmitting the desired selected content to the network device based on a sequence of the identifiers of the desired selected content stored in the queue means and further based on at least one of usage and storage status data of received selected content stored on the network device. The storage status includes at least one of a hidden status, an erased status, and an amount of the received selected content stored in the memory means.

In other features, the network device receives the desired selected content asynchronously with respect to a user request. The remote content provider means transmits the desired selected content to the network device when the user selects the desired selected content, the network device stores the desired selected content as the received selected content, and the received selected content becomes accessible to the user based on the at least one of the usage and the storage status data. The received selected content stored in the hidden section of the memory has the hidden status. The storage status includes a period of time that the received selected content is stored on the network device.

In other features, the remote content provider means transmits the desired selected content when the received selected content is erased from the network device. The user at least one of views the desired selected content, deletes the desired selected content, and modifies a sequence of the desired selected content in the queue means using the content requesting interface means. The received selected content is at least one of erased from the network device and moved to a hidden section of the network device after at least one of a period of time and a selected number of viewings. At least one of the network device and the remote content provider means automatically erases the received selected content.

In other features, the remote content provider means transmits the desired selected content when the user indicates that the received selected content is erased. The remote content provider means determines whether the received selected content is erased. The remote content provider means periodically searches the network device to determine whether the received selected content is erased. The received selected content is transferable to a removable storage medium based on an agreement between the user and the remote content provider means. An Internet website implements the content requesting interface means. The network device includes an optical data storage system. The network device includes at least one of a hard disk drive (HDD) system and a solid-state memory device.

A method for receiving selected content from a remote content provider at a network device includes adding desired selected content to a queue associated with a remote content provider, storing received selected content that is received from the remote content provider in a memory, providing at least one of usage and storage status data relating to the received selected content stored in the memory to the remote content provider, receiving additional ones of the desired selected content in the queue from the remote content provider based on the at least one of the usage and the storage status data of the received selected content in the memory, and storing the desired selected content received from the remote content provider as the received selected content in the memory. The storage status includes at least one of a hidden status, an erased status, and an amount of the received selected content stored in the memory.

In other features, the network device receives the desired selected content asynchronously with respect to a user request. The method further includes storing the received selected content in a hidden section of the memory, and making the received selected content accessible to a user based on at least one of a sequence of the desired selected content in the queue and the at least one of the usage and the storage status data. The received selected con tent stored in the hidden section of the memory has a hidden status. The storage status includes a period of time that the received selected content is stored at the network device.

In other features, the network device receives the desired selected content when the received selected content is erased from the network device. A user at least one of views the desired selected content, deletes the desired selected content, and modifies a sequence of the desired selected content in the queue at a content requesting interface. The received selected content is at least one of erased from the network device and moved to a hidden section of the network device after at least one of a predetermined period and a predetermined number of viewings. At least one of the network device and the remote content provider automatically erases the received selected content.

In other features, the network device receives the desired selected content when a user indicates that the received selected content is erased. The remote content provider determines whether the received selected content is erased. The remote content provider periodically searches the network device to determine whether the received selected content is erased. The received selected content is transferable to a removable storage medium based on an agreement between a user and the remote content provider. An Internet website implements the content requesting interface.

A system for providing selected content to a network device includes a queue that stores identifiers of the selected content, wherein the selected content is selected from available content, and a remote content provider that transmits the selected content to the network device. The network device receives and stores the selected content. The selected content stored on the network device is at least one of hidden from a user and unusable by the user. The selected content stored on the network device becomes at least one of visible to the user and usable by the user based on a sequence of the identifiers stored in the queue.

In other features, the selected content is stored in a hidden section of the network device. The selected content is transferred to a visible section of the network device when the selected content becomes visible. The network device includes a memory that stores the selected content. The memory includes at least one of a hard disk drive (HDD) and a solid-state memory device. The remote content provider transmits the selected content asynchronously with respect to a user request. The user selects the selected content at a content requesting interface.

In other features, the selected content becomes the at least one of visible to the user and usable by the user further based on a status of received selected content stored at the network device. The status of the received selected content includes at least one of a number of received selected content stored at the network device and a period of time that the previous delivered selections are stored at the network device. The selected content becomes the at least one of visible to the user and usable by the user when the received selected content is erased from the network device. The user at least one of views the selected content, deletes the selected content, and modifies a sequence of the identifiers stored in the queue using the content requesting interface.

In other features, the selected content is at least one of erased from the network device and moved to a hidden section of the network device after at least one of a predetermined period and a predetermined number of viewings. At least one of the network device and the remote content provider automatically erases the selected content. The selected content becomes the at least one of visible to the user and usable by the user when the user indicates that received selected content is erased. The remote content provider determines whether the received selected content is erased. The remote content provider periodically searches the network device to determine whether the received selected content is erased. The selected content is transferable to a removable storage medium based on an agreement between the user and the remote content provider. An Internet website implements the content requesting interface.

A system includes a server module that stores identifiers of available content. A remote content provider transmits selected content to a network device from the available content based on a queue including a list of identifiers of content associated with the network device. The remote content provider stores the selected content on the network device in at least one of a hidden state and an unusable state. The remote content provider selectively changes the at least one of the hidden state and the unusable state to at least one of an unhidden state and a usable state, respectively, based on at least one of usage and storage status data of selected content previously changed to the at least one of the unhidden state and the usable state on the network device.

In other features, the selected content is stored in a hidden section of the network device. The selected content is transferred to an unhidden section of the network device when the selected content becomes visible to a user. The network device includes a memory that stores the selected content. The memory includes at least one of a hard disk drive (HDD) and a solid-state memory device. The remote content provider transmits the selected content asynchronously with respect to a user request.

In other features, a user selects the selected content at a content requesting interface. The remote content provider changes the state further based on a sequence of the identifiers in the queue. The storage status data includes at least one of an amount of the selected content stored on the network device and a period of time that the selected content is stored on the network device. The remote content provider changes the at least one of the hidden state and the unusable state to the at least one of the unhidden state and the usable state when the previously changed selected content is erased from the network device. The user at least one of views the selected content, deletes the selected content, and modifies a sequence of the identifiers in the queue at the content requesting interface.

In other features, the selected content is at least one of erased from the network device and moved to a hidden section of the network device after at least one of a predetermined period and a predetermined number of viewings. At least one of the network device and the remote content provider automatically erases the selected content. The remote content provider changes the at least one of the hidden state and the unusable state to the at least one of the unhidden state and the usable state when the user indicates that the previously changed selected content is erased. The remote content provider determines whether the previously changed selected content is erased. The remote content provider periodically searches the network device to determine whether the previously changed selected content is erased. The selected content is transferable to a removable storage medium based on an agreement between a user and the remote content provider. An Internet website implements the content requesting interface.

A system includes server means for storing identifiers of available content, remote content provider means for transmitting selected content to a network device from the available content based on a queue including a list of identifiers of content associated with the network device. The remote content provider means stores the selected content on the network device in at least one of a hidden state and an unusable state. The remote content provider means selectively changes the at least one of the hidden state and the unusable state to at least one of an unhidden state and a usable state, respectively, based on at least one of usage and storage status data of selected content previously changed to the at least one of the unhidden state and the usable state on the network device.

In other features, the selected content is stored in a hidden section of the network device. The selected content is transferred to an unhidden section of the network device when the selected content becomes visible to a user. The network device includes memory means for storing the selected content. The memory means includes at least one of a hard disk drive (HDD) and a solid-state memory device. The remote content provider means transmits the selected content asynchronously with respect to a user request. A user selects the selected content at a content requesting interface.

In other features, the remote content provider means changes the state further based on a sequence of the identifiers in the queue. The storage status data includes at least one of an amount of the selected content stored on the network device and a period of time that the selected content is stored on the network device. The remote content provider means changes the at least one of the hidden state and the unusable state to the at least one of the unhidden state and the usable state when the previously changed selected content is erased from the network device. The user at least one of views the selected content, deletes the selected content, and modifies a sequence of the identifiers in the queue at the content requesting interface.

In other features, the selected content is at least one of erased from the network device and moved to a hidden section of the network device after at least one of a predetermined period and a predetermined number of viewings. At least one of the network device and the remote content provider means automatically erases the selected content. The remote content provider means changes the at least one of the hidden state and the unusable state to the at least one of the unhidden state and the usable state when the user indicates that the previously changed selected content is erased. The remote content provider means determines whether the previously changed selected content is erased. The remote content provider means periodically searches the network device to determine whether the previously changed selected content is erased. The selected content is transferable to a removable storage medium based on an agreement between a user and the remote content provider means. An Internet website implements the content requesting interface.

A method for providing selected content includes storing identifiers of available content, selecting content from the available content, transmitting the selected content to a network device based on a queue including a list of identifiers of content associated with the network device, storing the selected content on the network device in at least one of a hidden state and an unusable state, and selectively changing the at least one of the hidden state and the unusable state to at least one of an unhidden state and a usable state, respectively, based on at least one of usage and storage status data of selected content previously changed to the at least one of the unhidden state and the usable state on the network device.

In other features, the method further includes selectively changing the at least one of the hidden state and the unusable state to the at least one of the unhidden state and the usable state further based on a sequence of the identifiers in the queue. Transmitting the selected content includes transmitting the selected content asynchronously with respect to a user request. Selecting the content includes selecting the content at a content requesting interface. The storage status data of the previously changed selected content includes at least one of an amount of selected content stored on the network device and a period of time that the selected content is stored on the network device. At least one of the hidden state and the unusable state is changed to the at least one of the unhidden state and the usable state when the previously changed selected content is erased from the network device.

In other features, the user at least one of views the selected content, deletes the selected content, and modifies a sequence of the identifiers stored in the queue at the content requesting interface. The selected content is at least one of erased from the network device and changed to at least one of the hidden state and the unusable state after at least one of a predetermined period and a predetermined number of viewings. The at least one of the hidden state and the unusable state is changed to the at least one of the unhidden state and the usable state when the user indicates that the previously changed selected content is erased. The method further includes periodically searching the network device to determine whether the previously changed selected content is erased.

A computer program stored for use by a processor for operating a network device includes adding desired selected content to a queue associated with a remote content provider, storing received selected content that is received from the remote content provider in a memory, providing at least one of usage and storage status data relating to the received selected content stored in the memory to the remote content provider, receiving additional ones of the desired selected content in the queue from the remote content provider based on the at least one of the usage and the storage status data of the received selected content in the memory, and storing the desired selected content received from the remote content provider as the received selected content in the memory. The storage status includes at least one of a hidden status, an erased status, and an amount of the received selected content stored in the memory.

In other features, the network device receives the desired selected content asynchronously with respect to a user request. The computer program further includes storing the received selected content in a hidden section of the memory, and making the received selected content accessible to a user based on at least one of a sequence of the desired selected content in the queue and the at least one of the usage and the storage status data. The received selected content stored in the hidden section of the memory has the hidden status. The storage status includes a period of time that the received selected content is stored at the network device.

In other features, the network device receives the desired selected content when the received selected content is erased from the network device. A user at least one of views the desired selected content, deletes the desired selected content, and modifies a sequence of the desired selected content in the queue at a content requesting interface. The received selected content is at least one of erased from the network device and moved to a hidden section of the network device after at least one of a predetermined period and a predetermined number of viewings. At least one of the network device and the remote content provider automatically erases the received selected content.

In other features, the network device receives the desired selected content when a user indicates that the received selected content is erased. The remote content provider determines whether the received selected content is erased. The remote content provider periodically searches the network device to determine whether the received selected content is erased. The received selected content is transferable to a removable storage medium based on an agreement between a user and the remote content provider. An Internet website implements the content requesting interface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 9A-9D are flowcharts illustrating security steps performed by the provider and/or requester network devices;

DETAILED DESCRIPTION OF THE PREFERRED EMBODIMENTS

Figure 1:
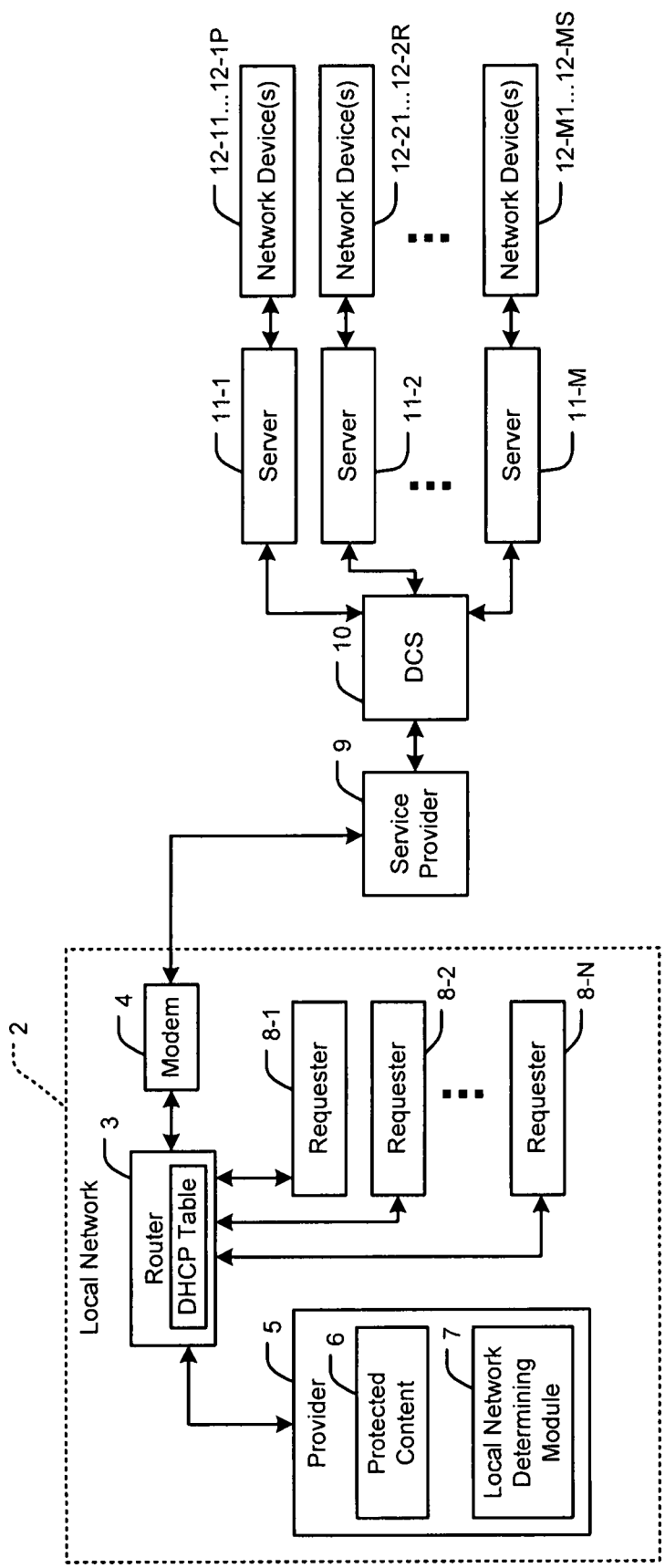
FIG. 1 is a functional block diagram of a provider network device that provides protected digital content to one or more requester network devices in a local network.

The following description of the preferred embodiment(s) is merely exemplary in nature and is in no way intended to limit the invention, its application, or uses. As used herein, the term module or device refers to an application specific integrated circuit (ASIC), an electronic circuit, a processor (shared, dedicated, or group) and memory that execute one or more software or firmware programs, a combinational logic circuit, and/or other suitable components that provide the described functionality. For purposes of clarity, the same reference numbers will be used in the drawings to identify similar elements.

Referring now to FIG. 1, a local network 2 includes a router 3, a modem 4, and a provider network device 5, which selectively provides protected content 6 to one or more local requester network devices as will be described below. The provider network device 5 is a network compatible device that includes a local network determining module 7. One or more requester network devices 8-1, 8-2, . . . and 8-N (collectively referred to as requesters 8) selectively request copies of the protected content 6. As can be appreciated, while the router 3 and wire line connections are shown, other network configurations will be apparent to skilled artisans including but not limited to wireless Access Points (AP), ad-hoc network connection configurations, and/or wireless network configurations. While the provider network device 5 is shown to include memory such as nonvolatile memory for the protected content 6, the protected content 6 may be stored internally and/or externally from the provider network device 5.

The modem 4 is connected to a broadband service provider 9, which provides video content, digital content, a broadband connection to a distributed communications system (DCS) 10, and/or other network services. The service provider 9 may provide broadband access using wired or wireless connections, coaxial cable, digital subscriber line (DSL), satellite and/or any other connection system or method.

The DCS 10 is connected by one or more servers 11-1, 11-2, and 11-M to network devices 12-11, 12-12, . . . , 12-1P, 12-21, 12-22, . . . , 12-2P, . . . , and 12-M1, 12-M2, . . . , 12-MP (collectively referred to as network devices 12). The local network determining module 7 selectively determines whether the requester network device has a local or remote status when the requester network device requests a copy of the protected content 6. This approach increases security by preventing access to the protected content by remote network devices.

There are many different ways for the local network determining module 7 to determine the local/remote status of a requester network device. For example in some implementations, the provider network device 5 determines local/remote status by determining the amount of time that is required to receive a response from the requester network device. If the response time is less than a predetermined period, then the requester network device is determined to have a local status. If not, the requester network device has a remote status and the copy of the protected content is denied. The amount of time that is required to send and receive data via the service provider 9, DCS 10 and servers 11 to the remote network devices 12 is significantly greater than the amount of timer required by a local requester network device to respond. In other words, the predetermined period is set greater than the response time required by local requester network devices and less than the response time required by remote requester network devices.

In other implementations, the provider network device checks a dynamic host configuration protocol (DHCP) table in a DHCP server to determine medium access control (MAC) addresses of local network devices. If the requester network device matches a local MAC address in the table, then the requester network device has a local status and the copy of the protected content can be sent. If not, the requester network device has a remote status and the copy of the protected content is not sent.

In still other implementations, the provider network device 5 may send a message to the router 3 to temporarily block external ports of the router 3 or modem 4 to the service provider 9 (and DCS 10). After blocking the external ports, the provider network device 5 determines whether the requester network device is still able to communicate (which will be true if the requester network device has a local status). If the provider network device can communicate with the requester network device, the provider network device sends the copy protected content. As can be appreciated by skilled artisans, one or more of these approaches may be combined and/or other approaches may be used to determine the local/remote status of the requester network device.

While portions of the following description employ a DVD system and/or a combined DVD/HDD system as the provider network device and another network device including a combined DVD/HDD system and/or a HDD system as the requester network device, skilled artisans will appreciate that other provider and/or requester network devices may be used. Skilled artisans will also appreciate that all of the implementations that are described below in conjunction with DVD and HDD systems can be implemented with any other suitable network devices.

Figure 2:
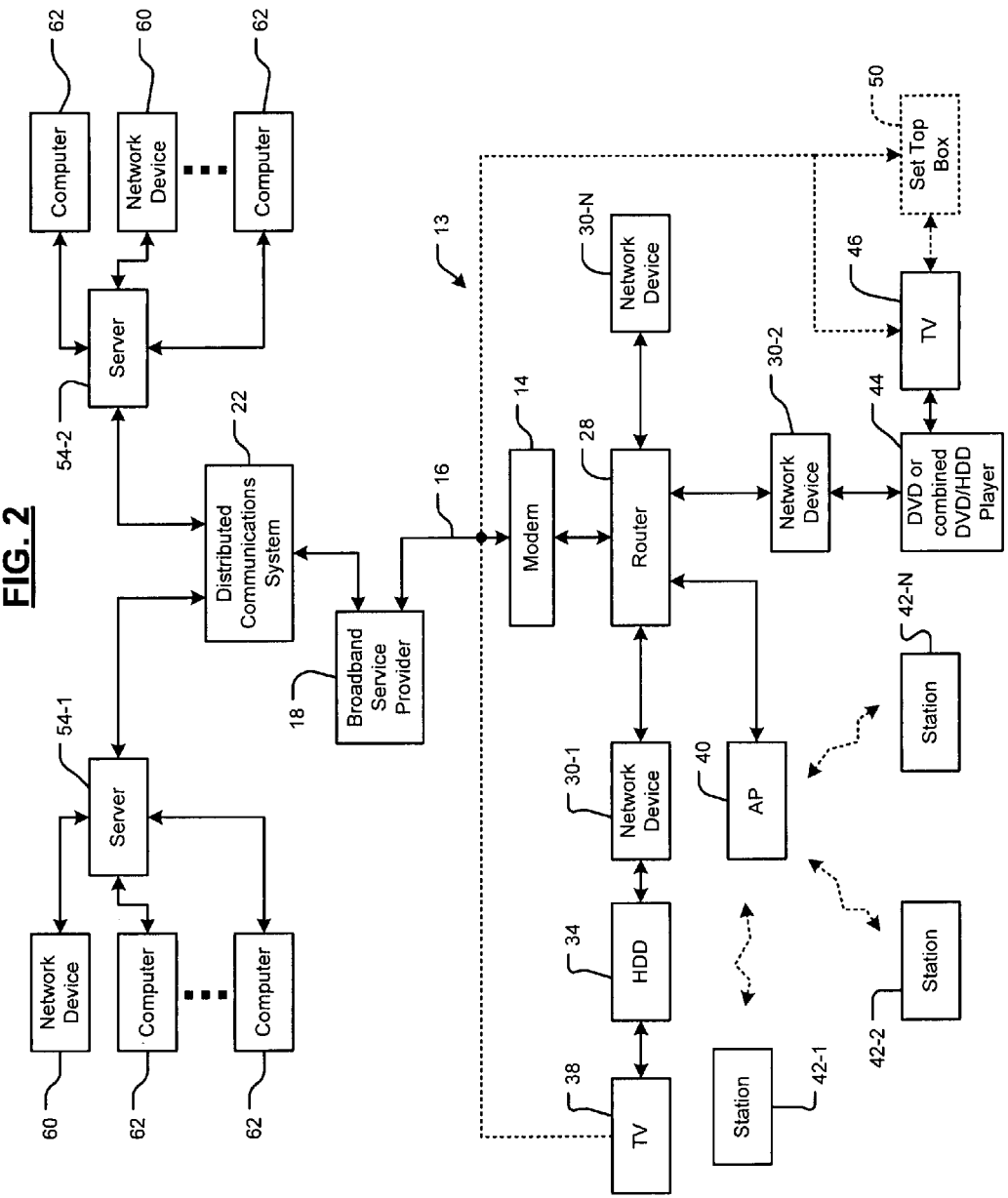
FIG. 2 is a functional block diagram of a first exemplary networked DVD and HDD system according to the present invention that communicates with a modem.

Referring now to FIG. 2, a functional block diagram of a first exemplary networked DVD and HDD system is shown. A local network 13 includes a modem 14 that communicates over medium 16 with a service provider 18. The service provider 18 provides a connection to a distributed communications system (DCS) 22 such as the Internet, LAN, WAN, or other distributed network and/or provides other network services such as video content, telephone services and the like. The modem 14 can be connected to a router 28, which connects multiple network devices 30-1, 30-2, . . . , and 30-N (collectively network devices 30) to the modem 14. One of the network devices 30-1 is connected to a hard disk drive (HDD) system 34, which may be connected to a television or monitor 38. The television or monitor 38 may also be connected to the medium 16 either directly or through a set top box (not shown) and receive content from the service provider 18.

The local network 13 may include an access point (AP) 40 that communicates with the router 28 and one or more wireless stations 42-1, 42-2, . . . , and 42-N (collectively wireless stations 42). While the AP 40 is shown connected to the router 28, the AP and router functions may be combined in a single device. Alternately, a combined AP/router may be directly connected to the modem 14. Still other types of network configurations and connections will be apparent to skilled artisans.

The network device 30-2 communicates with the router 28 and with a DVD player or a combined DVD/HDD player 44 (both referred to hereinafter as "DVD player 44") such as the one shown and described in U.S. patent application Ser. No. 11/039,288, filed Jan. 19, 2005, which is hereby incorporated by reference in its entirety. The DVD player 44, in turn, may communicate with a television or monitor 46, which may be connected to the medium 16 or to a set top box 50. The service provider 18 provides broadband access to the DCS 22, video content and/or other services. One or more other servers 54-1 and 54-2, (collectively servers 54) provide an interface for network devices 60, computers 62, personal digital assistants (PDAs), etc. to the DCS 22.

In some implementations, the user of the television or monitor 38 may desire access to DVD content associated with the DVD player 44. Initially, the HDD 34 may request a list of available content from the DVD player. The DVD sends a list of available content. The HDD 34 sends a message to the DVD player 44 via the network requesting a copy of content selected from the list. The DVD system determines whether the HDD system has a local status. If the HDD system or other requester network device has local status, the content file is sent. If the HDD system or other requester network device has a remote status, the request is denied. The local/remote status determination can be made based upon response time, MAC addresses in the DHCP table, external port disconnection and corresponding dialogue, and/or other suitable methods.

In some implementations, the DVD 44 responds by requesting a key from the HDD 34. The DVD 44 begins a timer that determines the amount of time that is required by the HDD 34 to respond. The HDD 34 sends the requested key to the DVD 44. The DVD 44 determines whether the HDD 34 responded within a predetermined amount of time.

If the HDD 34 responds within the predetermined amount of time, the DVD 44 scrambles the selected content with the key and sends the scrambled content over the network to the HDD 34. The HDD 34 descrambles the content with the key and allows replay of the content at the television or monitor 38. As can be appreciated, the key exchange can also occur earlier when the HDD initially requests the list of available content.

The HDD 34 may also receive usage data from the DVD player that constrains use. For example, the usage data may allow N replays and/or replay for a predetermined period. After the allowed usage period is over as specified in the usage data, the HDD 34 makes the video content unavailable. For example, the HDD may delete the video content.

In some implementations, the HDD 34 includes a user accessible section and a hidden section. The video content from the DVD 44 is stored in the hidden section of the DVD 44. The key that is provided by the HDD 34 may be part of a public/private key encryption system and/or other suitable data encryption. Alternately other forms of key-based scrambling can be performed.

If the DVD player is a single DVD player, the DVD sends a list of content available on the DVD in the DVD player. If the DVD player includes a carousel, the DVD player sends a list of DVD content available from DVDs in the carousel. If the DVD player is a combined DVD/HDD player, the DVD/HDD player sends a list of DVD content available on the DVD or DVDs in the player along with DVD content stored on the associated HDD.

Figure 3:
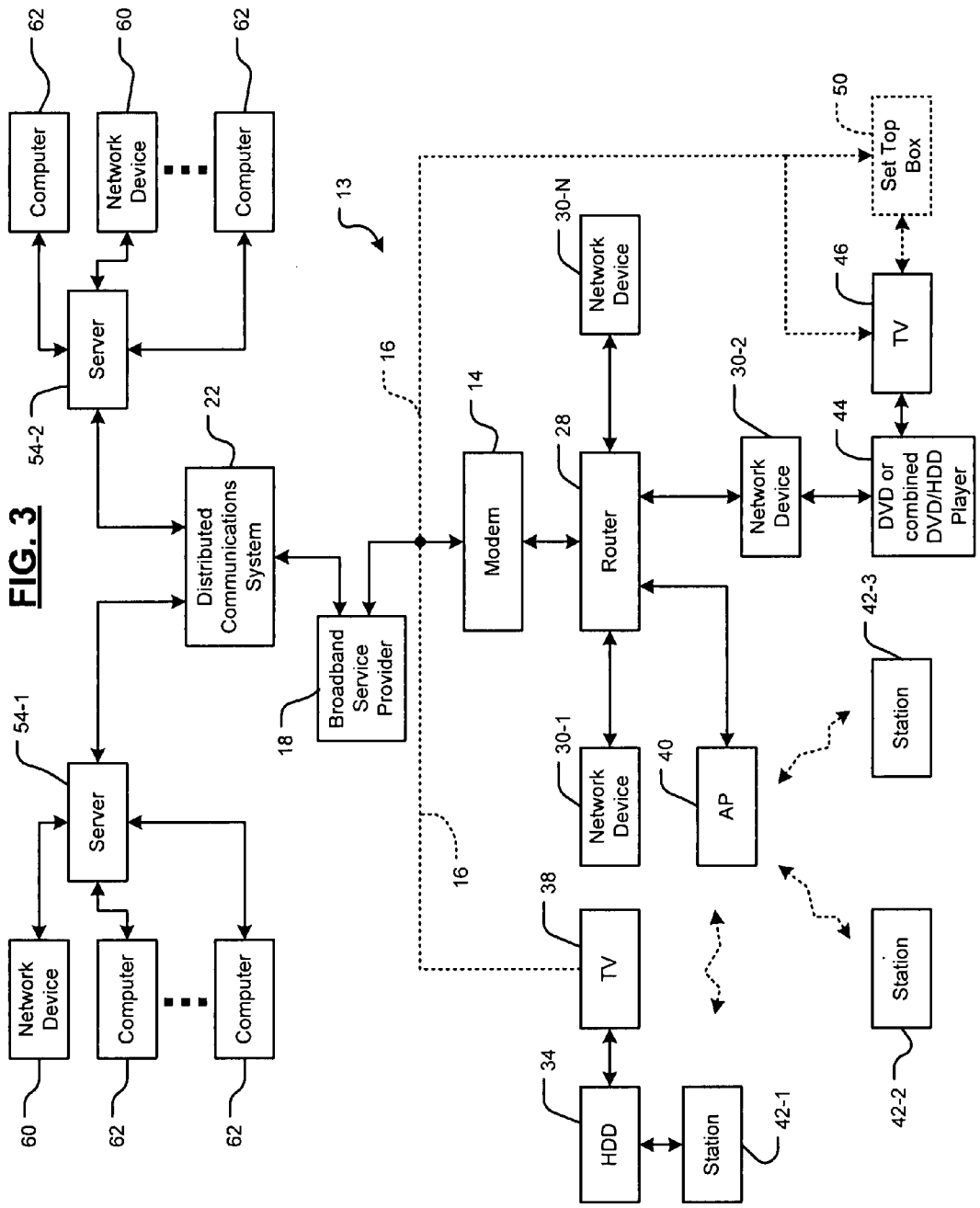
FIG. 3 is a functional block diagram of a second exemplary networked DVD and HDD system according to the present invention that communicates with a modem.
Figure 4:
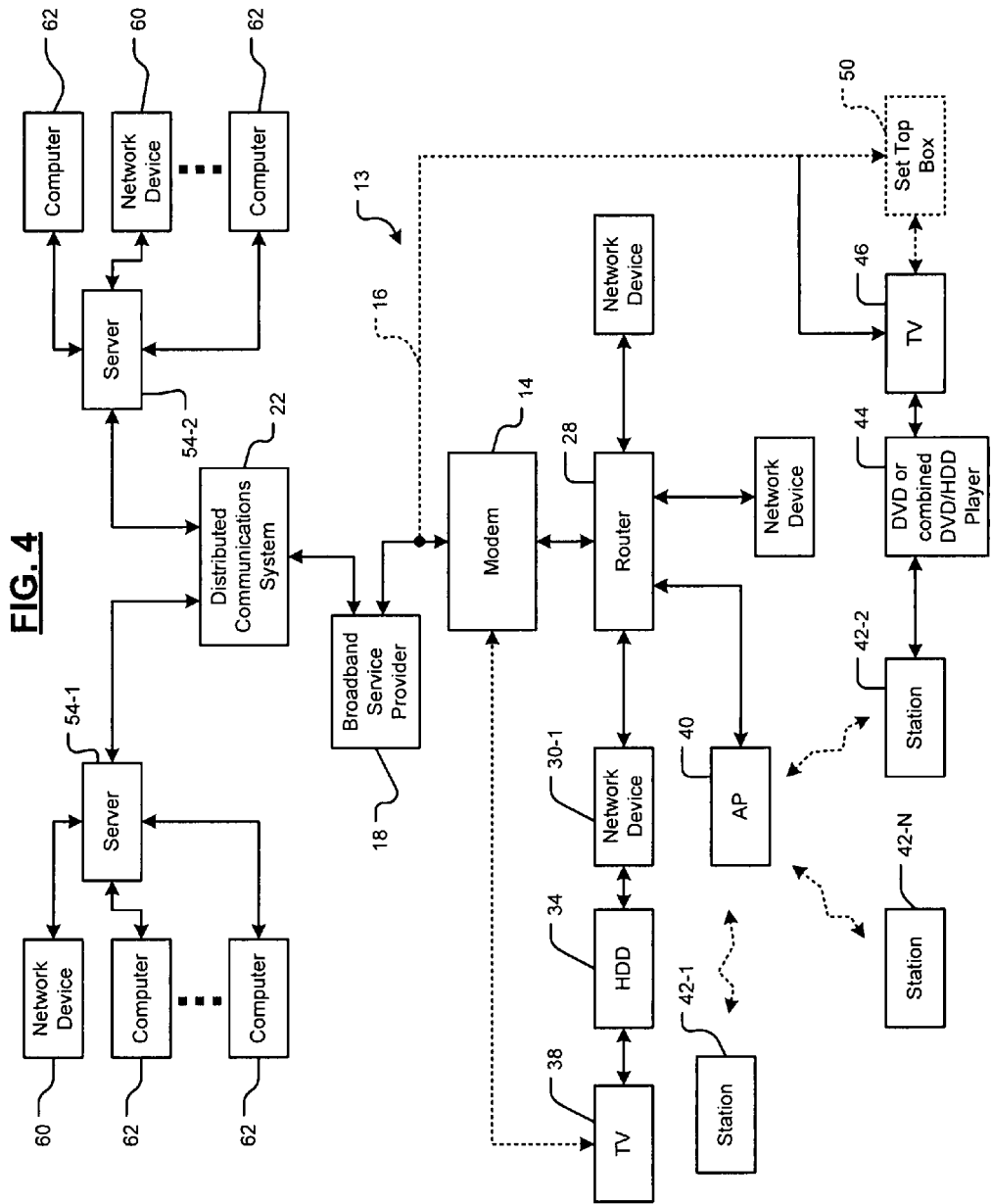
FIG. 4 is a functional block diagram of a third exemplary networked DVD and HDD system according to the present invention that communicates with a modem.
Figure 5:
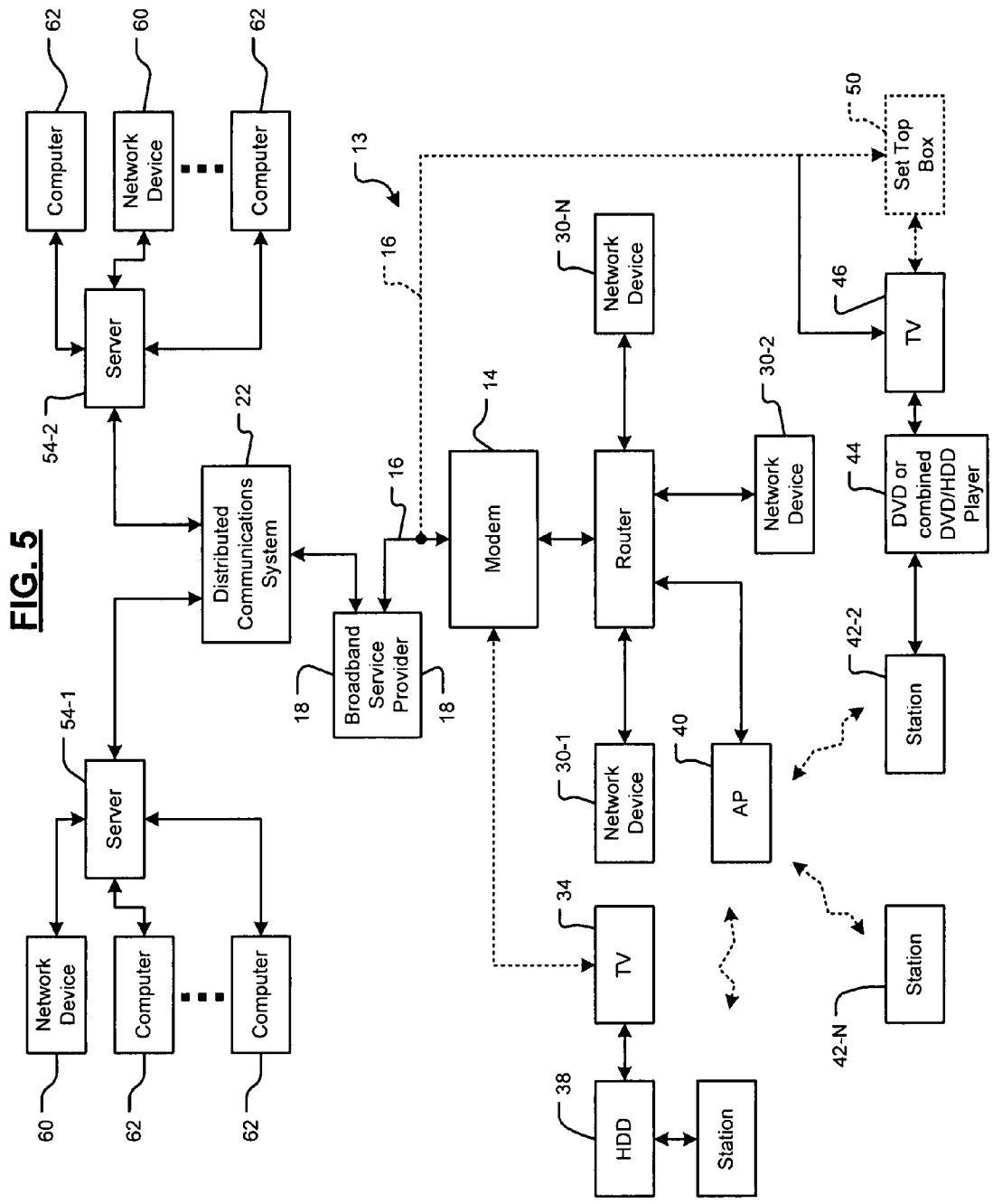
FIG. 5 is a functional block diagram of a fourth exemplary networked DVD and HDD system according to the present invention that communicates with a modem.

Referring now to FIGS. 3-5, various exemplary configurations of the present invention are shown. In these implementations, the provider network device includes a DVD system and/or a combined DVD/HDD system and the requester network device includes a HDD system and/or a combined DVD/HDD system. In FIG. 3, the HDD 34 is connected to the network by the station 42-1, which wirelessly communicates with the AP 40. The DVD 44 and television 46 are connected by the network device 30-2 and medium 16 to the router 28. In FIG. 4, the HDD 34 is connected by the network device 30-1 and medium 16 to the router 28. The DVD 44 is connected to the network by the station 42-2, which wirelessly communicates with the AP 40. In FIG. 5, the HDD 34 and DVD 44 are connected by one or more stations 42-1 and/or 42-2 to the network. Various other network configurations will be apparent to skilled artisans.

Figure 6:
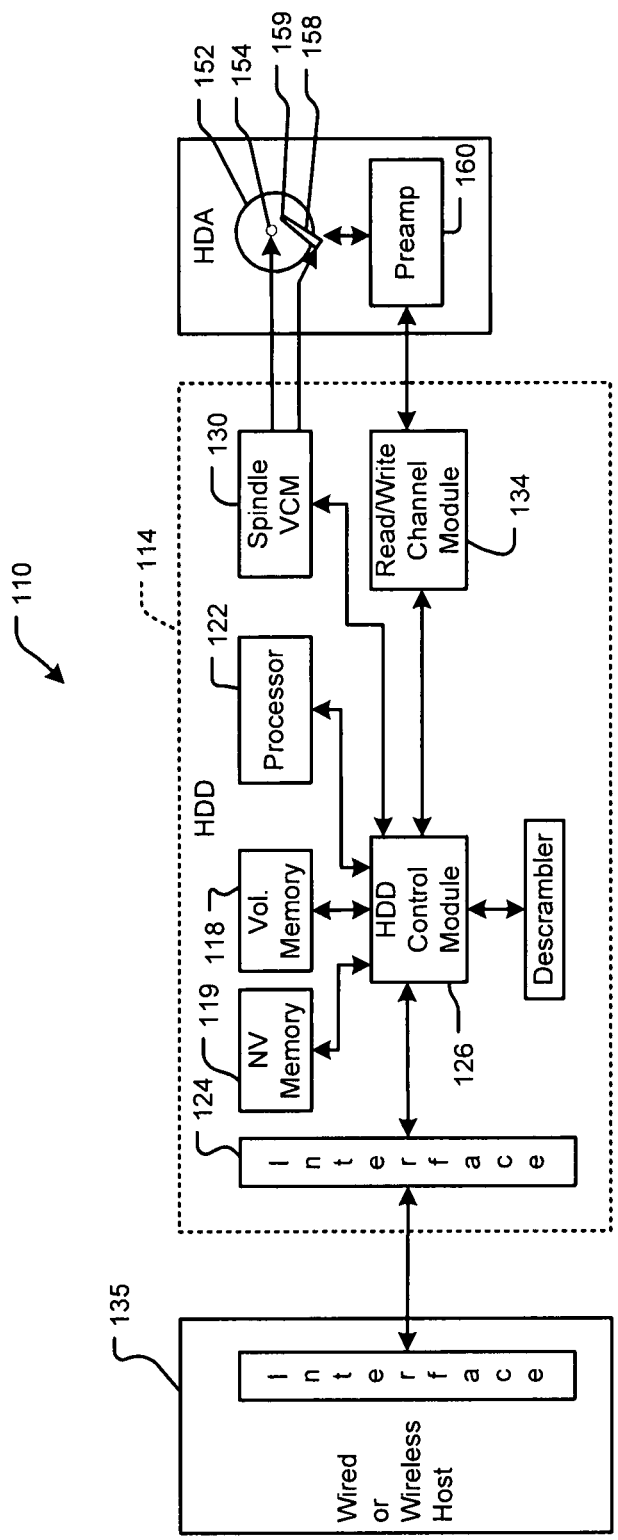
FIG. 6 is a functional block diagram of an exemplary requester network device including a HDD system.

Referring now to FIG. 6, an exemplary requester network device includes a HDD system 110 with a HDD PCB 114. A buffer 118 stores read, write and/or volatile control data that is associated the control of the HDD system 110. The buffer 118 usually employs volatile memory having low latency. For example, SDRAM or other types of low latency memory may be used. Nonvolatile memory 119 such as flash memory may also be provided to store critical data such as nonvolatile control code.

A processor 122 arranged on the HDD PCB 114 performs data and/or control processing that is related to the operation of the HDD system 110. A hard disk control module (HDC) 126 communicates with an input/output interface 124 and with a spindle/voice coil motor (VCM) driver or module 130 and/or a read/write channel module 134. The HDC 126 coordinates control of the spindle/VCM driver 130, the read/write channel module 134 and the processor 122 and data input/output with a host 135 via the interface 124.

During write operations, the read/write channel module 134 encodes the data to be written onto a read/write device 159. The read/write channel module 134 processes the write signal for reliability and may apply, for example, error correction coding (ECC), run length limited coding (RLL), and the like. During read operations, the read/write channel module 134 converts an analog read signal output of the read/write device 159 to a digital read signal. The converted signal is then detected and decoded by known techniques to recover the data that was written on the HDD.

A hard disk drive assembly (HDDA) 150 includes one or more hard drive platters 152 that include magnetic coatings that store magnetic fields. The platters 152 are rotated by a spindle motor that is schematically shown at 154. Generally the spindle motor 154 rotates the hard drive platter 152 at a controlled speed during the read/write operations. One or more read/write arms 158 move relative to the platters 152 to read and/or write data to/from the hard drive platters 152. The spindle/VCM driver 130 controls the spindle motor 154, which rotates the platter 152. The spindle/VCM driver 130 also generates control signals that position the read/write arm 158, for example using a voice coil actuator, a stepper motor or any other suitable actuator.

The read/write device 159 is located near a distal end of the read/write arm 158. The read/write device 159 includes a write element such as an inductor that generates a magnetic field. The read/write device 159 also includes a read element (such as a magneto-resistive (MR) element) that senses the magnetic field on the platter 152. The HDDA 150 includes a preamp circuit 160 that amplifies the analog read/write signals. When reading data, the preamp circuit 160 amplifies low level signals from the read element and outputs the amplified signal to the read/write channel module 134. While writing data, a write current is generated that flows through the write element of the read/write device 159. The write current is switched to produce a magnetic field having a positive or negative polarity. The positive or negative polarity is stored by the hard drive platter 152 and is used to represent data.

Figure 7A:
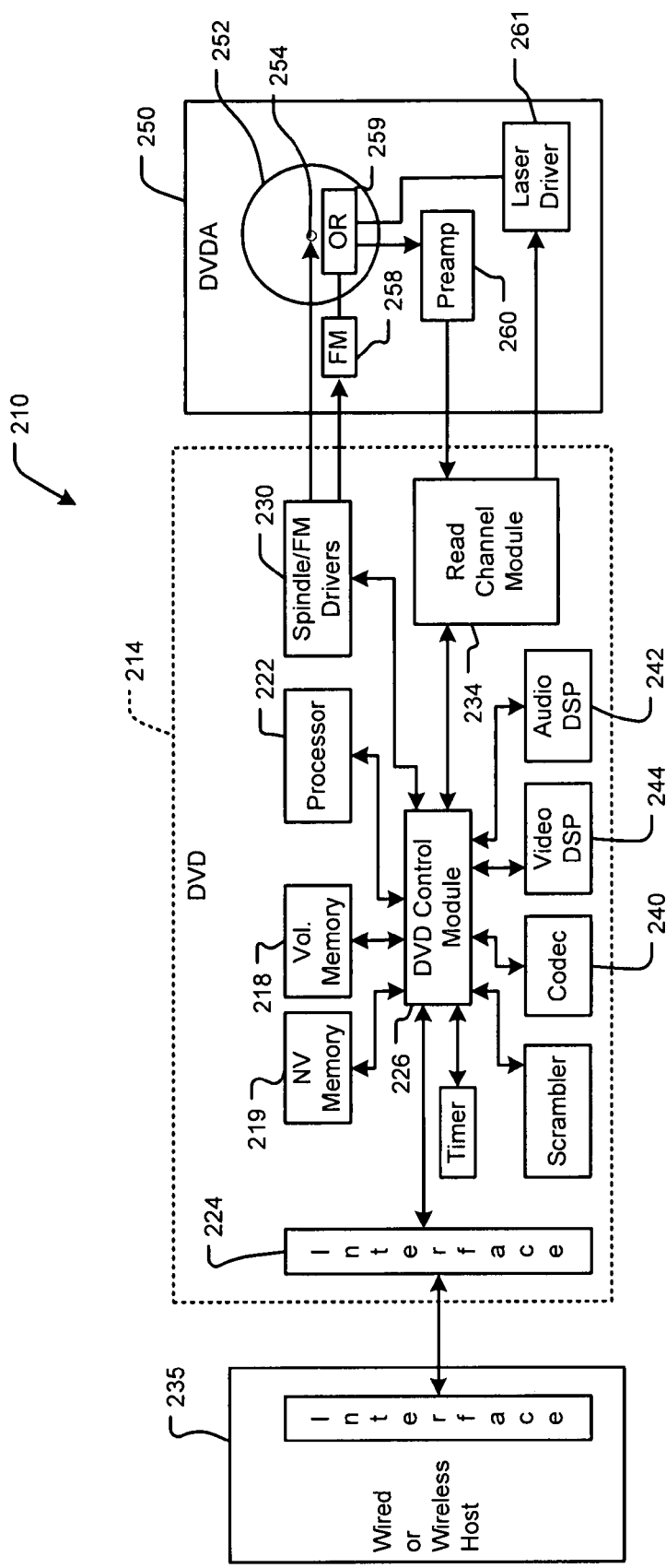
FIG. 7A is a functional block diagram of an exemplary provider network device including a DVD system with read-only operation.
Figure 7B:
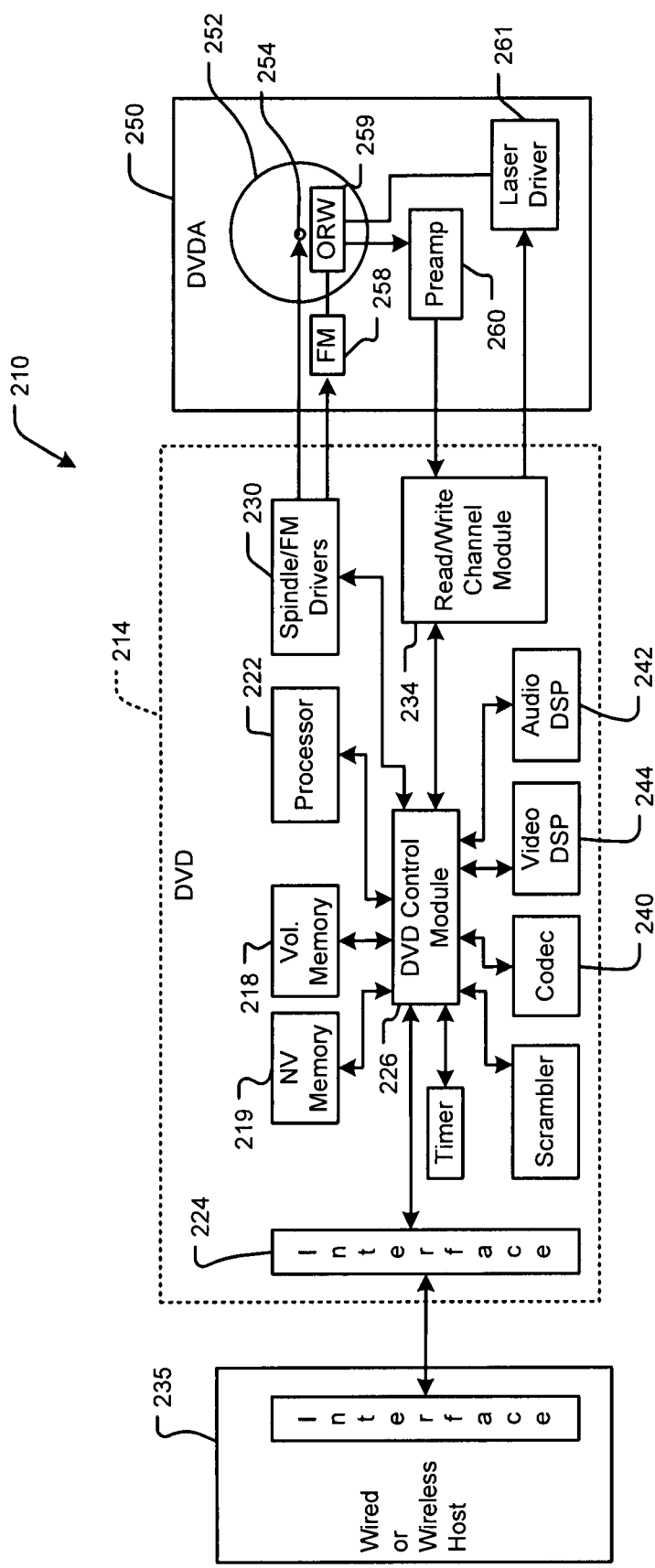
FIG. 7B is a functional block diagram of an exemplary provider network device including a DVD system with read-write operation.

Referring now to FIGS. 7A and 7B, an exemplary provider network device includes a DVD system 210. A DVD PCB 214 includes a buffer 218 that stores read data, write data and/or volatile control code that is associated the control of the DVD system 210. The buffer 218 may employ volatile memory such as SDRAM or other types of low latency memory. Nonvolatile memory 219 such as flash memory can also be used for critical data such as data relating to DVD write formats and/or other nonvolatile control code. A processor 222 arranged on the DVD PCB 214 performs data and/or control processing that is related to the operation of the DVD system 210. The processor 222 also performs decoding of copy protection and/or compression/decompression as needed. A DVD control module 226 communicates with an input/output interface 224 and with a spindle/feed motor (FM) driver 230 and/or a read/write channel module 234. The DVD control module 226 coordinates control of the spindle/FM driver, the read/write channel module 234 and the processor 222 and data input/output via the interface 224.

During write operations, the read/write channel module 234 encodes the data to be written by an optical read/write (ORW) or optical read only (OR) device 259 to the DVD platter. The read/write channel module 234 processes the signals for reliability and may apply, for example, ECC, RLL, and the like. During read operations, the read/write channel module 234 converts an analog output of the ORW or OR device 259 to a digital signal. The converted signal is then detected and decoded by known techniques to recover the data that was written on the DVD.

A DVD assembly (DVDA) 250 includes a DVD platter 252 that stores data optically. The platter 252 is rotated by a spindle motor that is schematically shown at 254. The spindle motor 254 rotates the DVD platter 252 at a controlled and/or variable speed during the read/write operations. The ORW or OR device 259 moves relative to the DVD platter 252 to read and/or write data to/from the DVD platter 252. The ORW or OR device 259 typically includes a laser and an optical sensor.

For DVD read/write and DVD read only systems, the laser is directed at tracks on the DVD that contain lands and pits during read operations. The optical sensor senses reflections caused by the lands/pits. In some DVD read/write (RW) applications, a laser may also be used to heat a die layer on the DVD platter during write operations. If the die is heated to one temperature, the die is transparent and represents one binary digital value. If the die is heated to another temperature, the die is opaque and represents the other binary digital value. Other techniques for writing DVDs may be employed.

The spindle/FM driver 230 controls the spindle motor 254, which controllably rotates the DVD platter 252. The spindle/FM driver 230 also generates control signals that position the feed motor 258, for example using a voice coil actuator, a stepper motor or any other suitable actuator. The feed motor 258 typically moves the ORW or OR device 259 radially relative to the DVD platter 252. A laser driver 261 generates a laser drive signal based on an output of the read/write channel module 234. The DVDA 250 includes a preamp circuit 260 that amplifies analog read signals. When reading data, the preamp circuit 260 amplifies low level signals from the ORW or OR device and outputs the amplified signal to the read/write channel module device 234.

The DVD system 210 further includes a codec module 240 that encodes and/or decodes video such as any of the MPEG formats. Audio and/or video digital signal processors and/or modules 242 and 244, respectively, perform audio and/or video signal processing, respectively.

As with the HDD system 110, portions of the DVD system 210 may be implemented by one or more integrated circuits (IC) or chips. For example, the processor 222 and the DVD control module 226 may be implemented by a single chip. The spindle/FM driver 230 and/or the read/write channel module 234 may also be implemented by the same chip as the processor 222, the DVD control module 226 and/or by additional chips. Most of the DVD system 210 other than the DVDA 250 may also be implemented as a SOC.

Figure 7C:
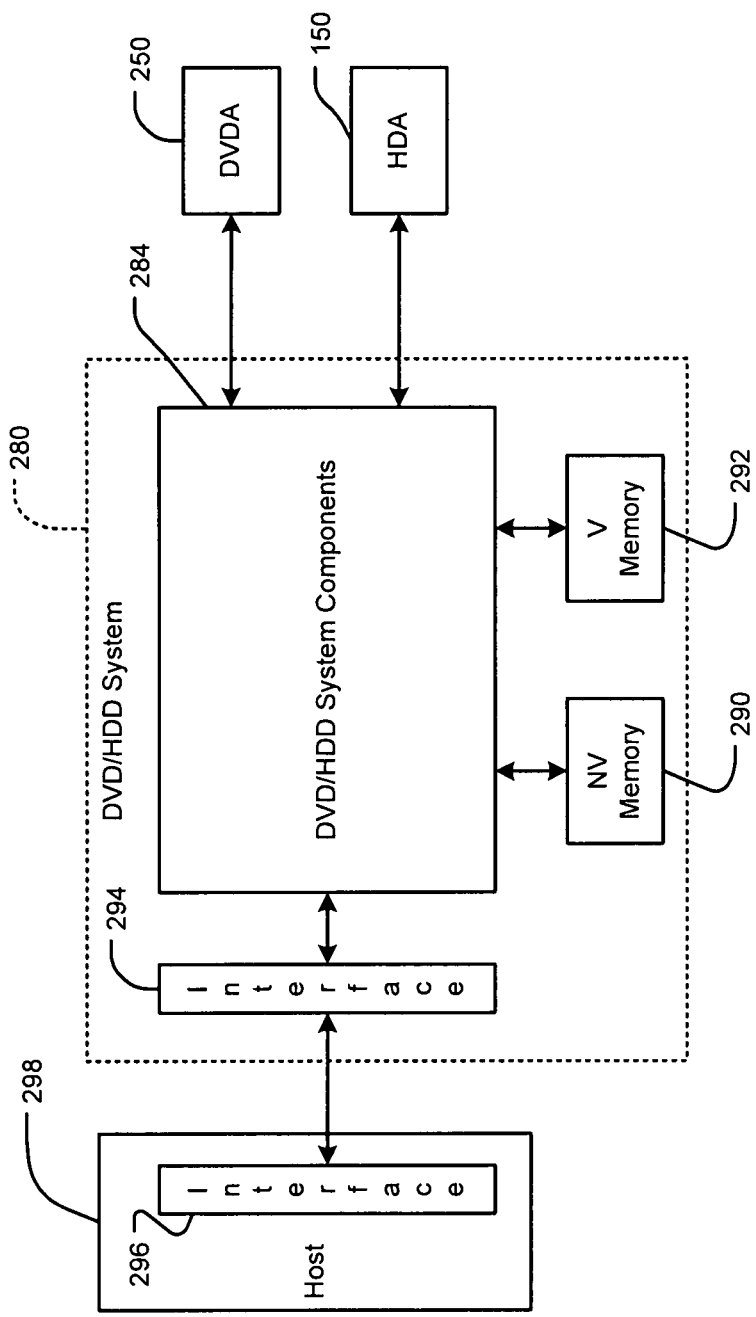
FIG. 7C is a functional block diagram of a provider or requester network device that includes a combined DVD/HDD system.

Referring now to FIG. 7C, a simplified functional block diagram of an exemplary combined DVD/HDD system 280 according to some implementations of the present invention is shown. The combined DVD/HDD system can be used as a provider or requester network device. The combined DVD/HDD system 280 includes a combined system control module 284 that communicates with nonvolatile memory 290 and volatile memory 292, which stored data for both DVD and HDD operation. The system control module 284 communicates via an interface 294 with an interface 296 of a host 298. In some implementations, the interfaces 294 and 296 are serial ATA interfaces, Fiber Channels (FC), serial attached small computer system interfaces (SAS), or other suitable interfaces.

The combined DVD/HDD system controls both DVD and HDD systems. The DVD/HDD system reduces overall system cost and provides improved functionality and performance. Cost is reduced through the use of a single DRAM and flash memory for both the DVD and HDD data storage. A single power supply and a reduced number of external connections are required, which further reduces cost.

In addition, the unified DVD/HDD system allows copy protected content to be copied bit-by-bit to directly to the HDD. In other words, the copy protected content can be copied without decrypting the copy protection scheme or digital rights management (DRM) and without requiring significant operating system involvement. Conventional separate DVD and HDD systems require the DVD to decode/decrypt the DRM or other copy protection prior to output. The DRM or other copy protection may or may not allow subsequent copying to the HDD. By combining the systems, additional functionality is provided due to the built-in security of the copy protection or DRM scheme since the DRM or copy protection remains intact. For example, single DVD drive copy operations are supported without removal of the copy protection or DRM. Additionally, the HDD can operate as a virtual DVD changer. Still other variations of the combined DVD/HDD system are shown and described in U.S. patent application Ser. No. 11/039,288, filed on Jan. 19, 2005.

Figure 8:
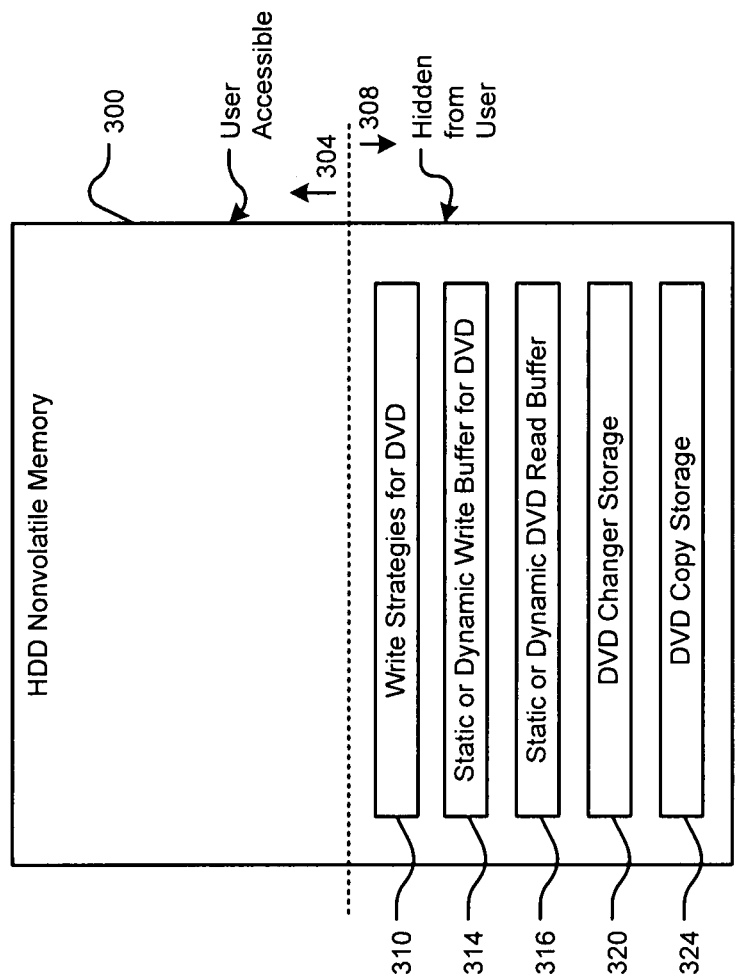
FIG. 8 illustrates user accessible and hidden sections of nonvolatile memory of the HDD of FIG. 6.

Referring now to FIG. 8, partitioning of the nonvolatile memory 300 of the HDD into user accessible and hidden areas according to some implementations is shown. The nonvolatile memory 300 of the HDD is allocated into a first portion 304 that is user accessible and a second portion 308 that is not user accessible (or hidden). The second hidden portion 308 is used in one or more of the following ways according to some implementations of the invention. The hidden portion 308 is used to store the contents of a DVD that is to be copied. In addition, the hidden portion 308 of the HDD is used to provide a virtual DVD carousel. In other words, multiple DVDs may be copied to the HDD and played back at a later date.

Referring now to FIG. 9A, steps performed by the network devices are shown. Control begins in step 350. In step 352, control determines whether the provider network device receives a request for a copy of protected content. If not, control returns to step 352. If step 352 is true, control determines whether the requester network device is located on the local network in step 354. If step 354 is false, control denies the request and returns to step 352. If step 354 is true, the provider network device sends a copy of the protected content to the requester network device.

The provider network device determines whether the requester network device is on the local network in any suitable fashion. For example, a response time of the requester network device can be compared to a predetermined threshold. In other implementations, the provider network device can temporarily request that the external ports of the router or modem be blocked so that the provider network device can confirm the local/remote status of the requester network device before the file sent. In other implementations, a local server can be queried to determine the local network devices. Still other methods for determining local/remote status may be used.

Referring now to FIG. 9B, steps for determining local/remote status by temporarily blocking an external port are shown. Control begins with step 360. In step 362, control determines whether the provider network device receives a request for a copy protected file. If step 362 is false, control returns to step 362. If step 362 is true, control continues with step 364 where the provider network device requests the external ports of the router or modem to be blocked. In step 368, the provider network device determines whether the requester network device has a local status. For example, the provider network device may send a message to the requester network device and wait for a response. If step 368 is false, the provider network device denies the request and control returns to step 362. If step 368 is true, the provider network device sends a copy of the file to the requester network device in step 370. The provider network device unblocks the external connection or port of the router or modem in step 374.

Figure 9D:
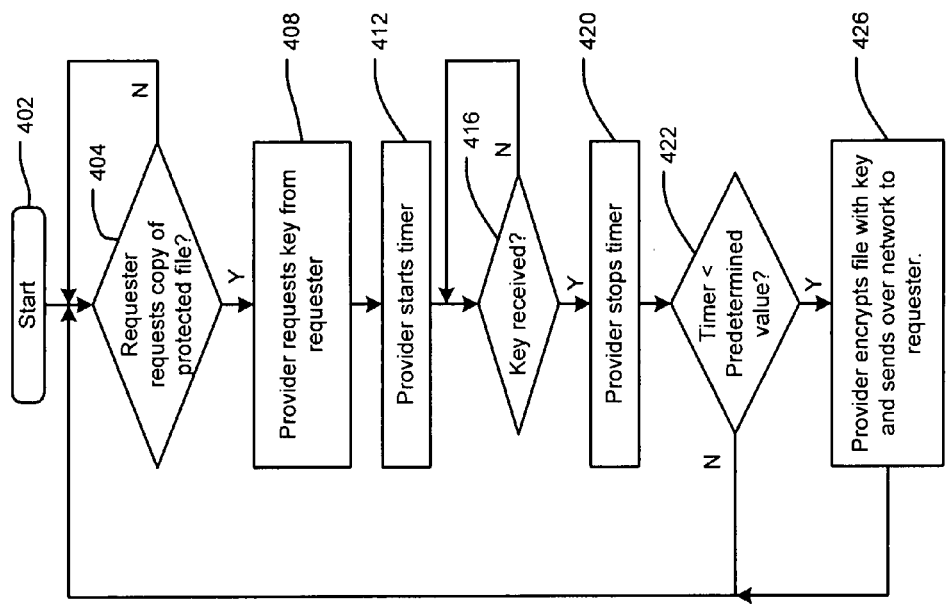
Figure 9C:
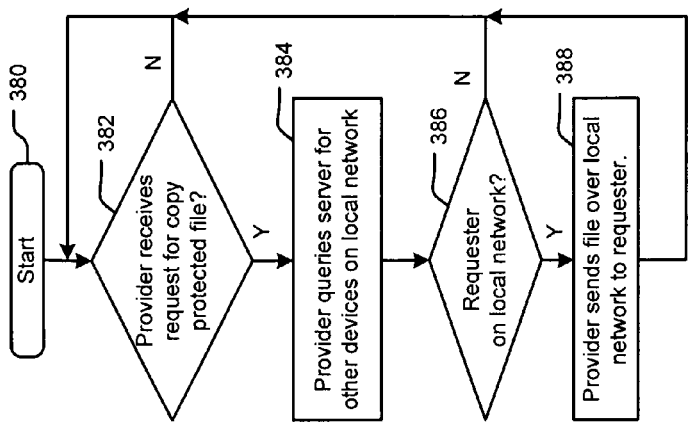

Referring now to FIG. 9C, steps for consulting a local server (such as a DHCP server) to determine the local/remote status are shown. Control begins with step 380. In step 382, control determines whether the provider network device receives a request for a copy protected file. If step 382 is false, control returns to step 382. If step 382 is true, control continues with step 384 where the provider network device queries the server for identification of local network devices. The identification can include MAC addresses although other identification types can be used. In step 386, the provider network device determines whether the requester network device has a local status. If step 386 is false, the provider network device denies the request and control returns to step 382. If step 386 is true, the provider network device sends a copy of the file to the requester network device in step 388.

Referring now to FIG. 9D, steps performed by the network system are shown generally at 400. In step 402, control begins. In step 404, the provider network device determines whether a requester network device requests a copy of the content. If not, control returns to step 404. Otherwise control continues with step 408 and the provider network device requests a key from the requester network device. In step 412, the provider network device starts a timer.

In step 416, the provider network device determines whether the key is received. If the key is not received and (in some implementations) the predetermined period has not been exceeded, control continues with step 416. Otherwise, control continues with step 420 and the provider network device stops the timer. In step 422, control determines whether the timer is less than a predetermined period.

In some implementations, the predetermined period is less than or equal to the amount of time that a packet would require to travel one or two hops. By limiting the response time, additional security is provided. The amount of time that would be required for a computer or other device outside of the home network to respond will exceed the predetermined period. In other words, a packet containing a key from a computer such as computer 62 or other network device such as network device 60 that is connected outside of the home network will exceed one or two hops. This is due to the time required to pass through the modem and the service provider.

If step 422 is false, control returns to step 404. If step 422 is true, the provider network device encrypts or scrambles the content with the key and sends the encrypted or scrambled content over the network to the requesting device in step 426 and control continues with step 404.

Figure 10:
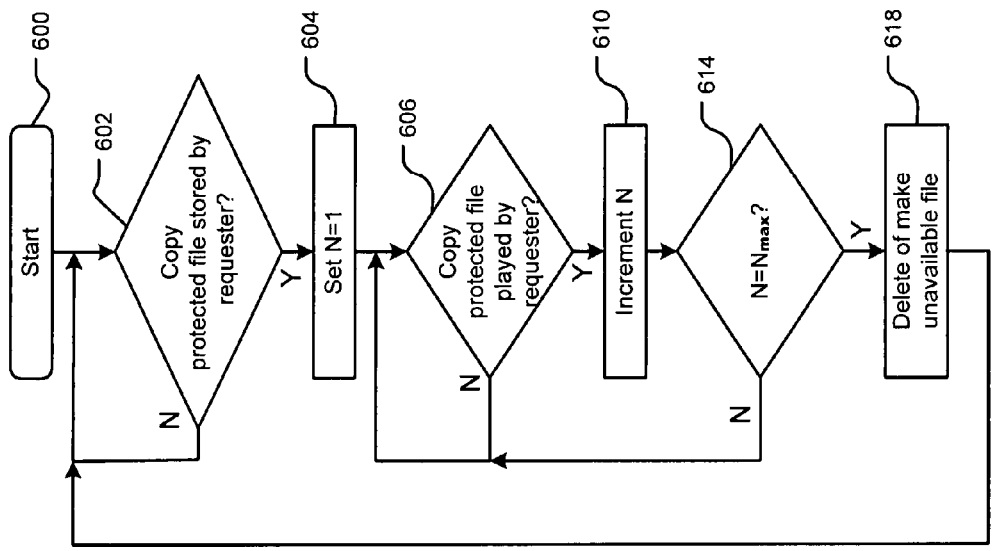
FIG. 10 is a flowchart illustrating steps of a method for allowing playback of a copy protected file from the requester network device N times.

Referring now to FIG. 10, steps of a method for allowing playback of a copy protected file from the requester network device N times are shown. Control begins with step 600. In step 602, control determines whether copy protected files have been stored on the requester network device. If not, control returns to step 602. It step 602 is true, control sets N=1 for the file in step 604. In step 606, control determines whether the copy protected file stored on requester network device has been played. If step 606 is false, control returns to step 606. If step 606 is true, control increments N in step 610. In step 614, control determines whether $N=N_{max}$. If step 614 is false, control returns to step 606. If step 614 is true, control deletes or otherwise makes the copy protected file unavailable from the requester network device in step 618 and control returns to step 602.

Figure 11:
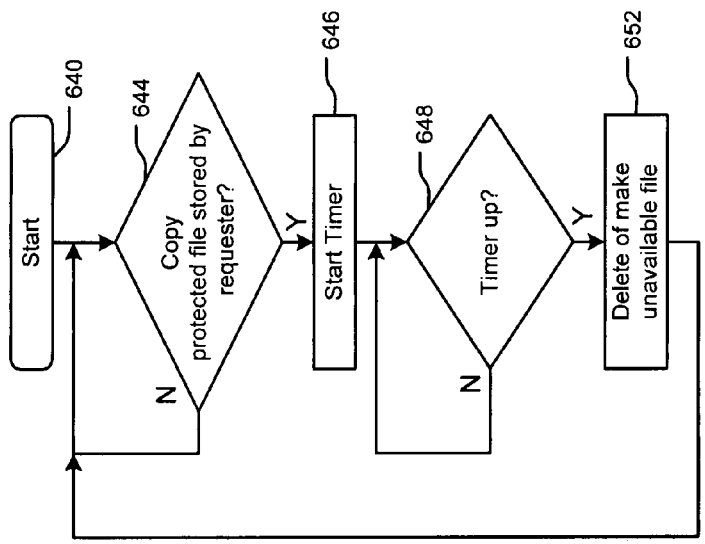
FIG. 11 is a flowchart illustrating steps of a method for limiting the amount of time that a copy protected file stored on the requester network device can be played.

Referring now to FIG. 11, steps of a method for limiting the amount of time that a copy protected file stored on the requester network device can be played are shown. Control begins with step 640. In step 644, control determines whether the copy protected file has been stored on the requester network device. If step 644 is false, control returns to step 644. Otherwise, control continues with step 646 and sets a timer. In step 648, control determines whether the timer is up. If step 648 is false, control returns to step 648. If step 648 is true, control deletes the copy protected file from the requester network device in step 652 and control continues with step 644. While a timer is described, any usage measurement and/or comparison may be performed. For example, a date and/or time stamp may be used and compared to current data and/or time. Still other usage data types will be apparent to skilled artisans.

Figure 12A:
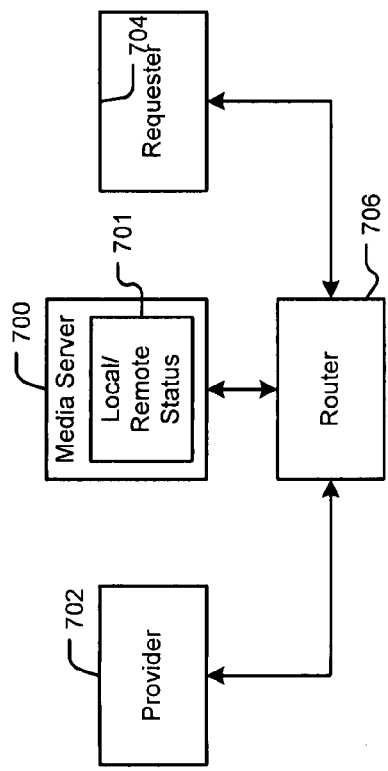
FIG. 12A is a functional block diagram of a network including a media server that serves protected content from a provider to a requester.

Referring now to FIG. 12A, a media server 700 can be used to serve protected content from a provider 702 to a requester 704. While a router is shown connecting the media server 700, the provider 702 and the requester 704, other network configurations and connections may be used such as but not limited to ad-hoc network modes, peer to peer modes, and other approaches. In some implementations, the media server includes a local/remote status determining module 701, as previously described above. The media server 700 provides a list of available content to the requester 704. The requester 704 requests content. The media server 700 confirms that the requester is on the local network in any of the ways described above. If the requester 704 is on the local network, the media server 700 requests the content from the provider 702. The provider 702 sends the content directly to the requester 704 or to the media server 700, which sends the content to the requester 704.

Figure 13:
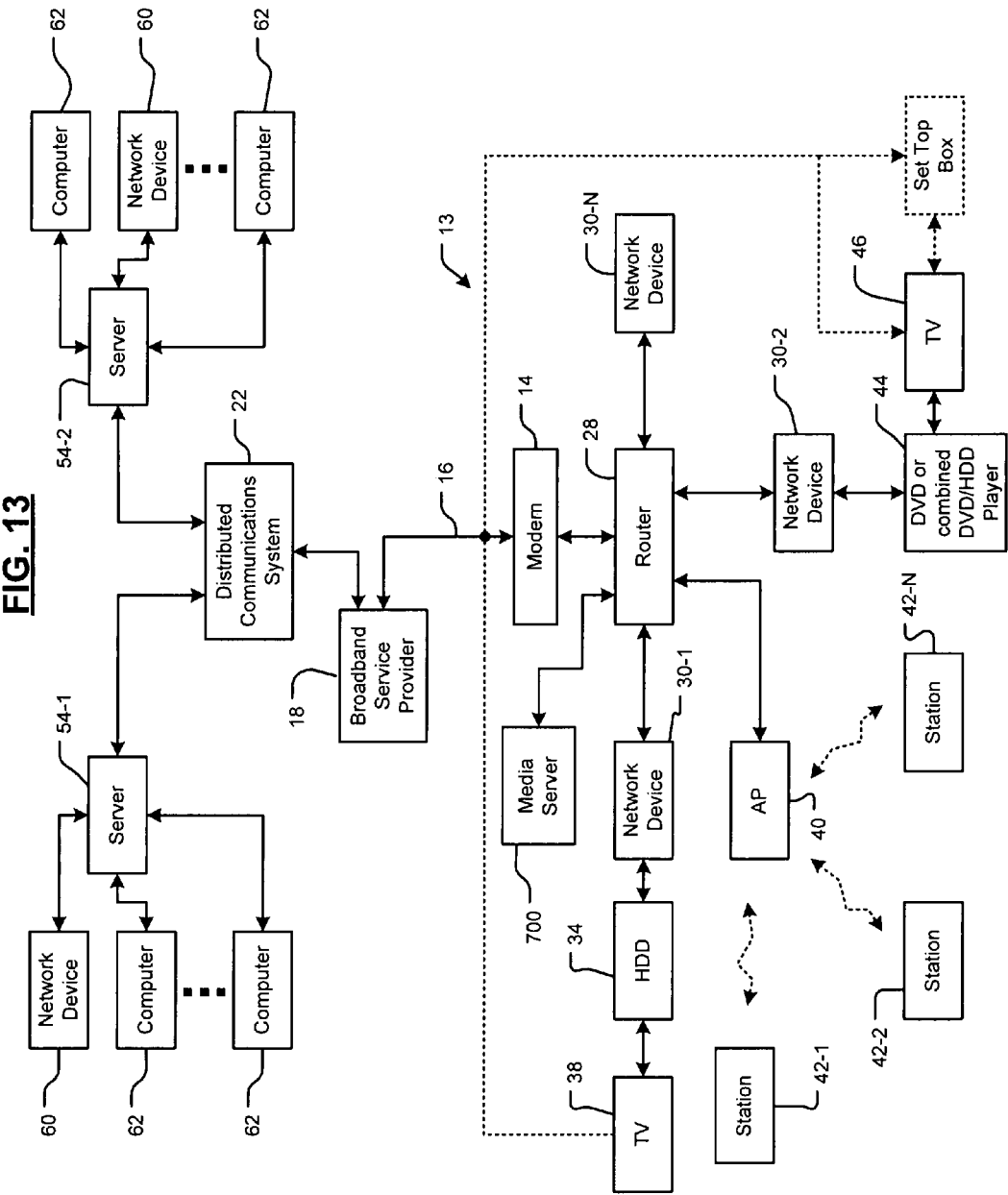
FIG. 13 illustrates the media server in an exemplary network configuration.
Figure 12B:
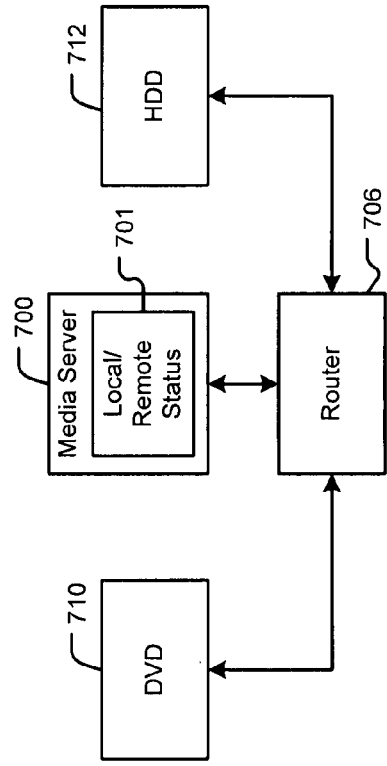
FIG. 12B is a functional block diagram of a network including a media server that serves protected content from a DVD system to a HDD system.

Referring now to FIGS. 12B and 13, the media server 700 serves protected content from a DVD system 710 to a HDD system 712. The DVD system 710 and the HDD system 712 can be implemented as described in the embodiments set forth above. In FIG. 13, the media server 700 can be implemented in a network as shown. Other network configurations such as those described herein as well as other network configurations are contemplated. The media server can be connected to the network in a wired or wireless manner.

Figure 14:
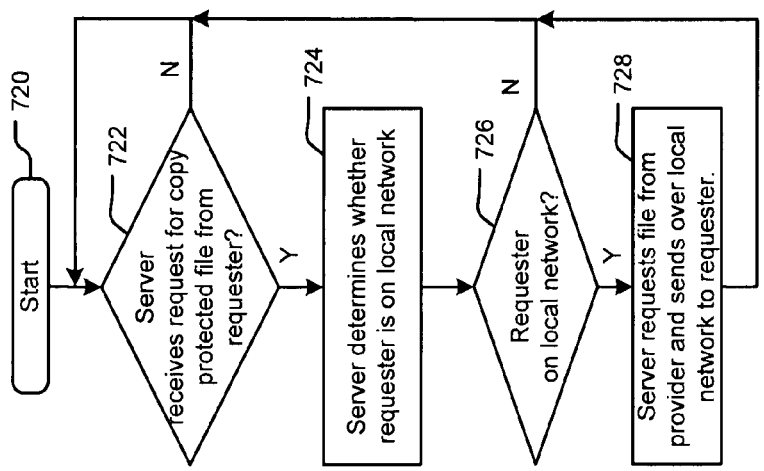
FIG. 14 is a flowchart illustrating steps performed by the media server according to the present invention.

Referring now to FIG. 14, a flowchart illustrating steps performed by the media server according to the present invention are shown. Control begins in step 720. In step 722, control determines whether the server receives a request for a copy of a protected file from the requester. If false, control returns to step 722. If true, the media server determines whether the requester has a local status. The local status of the requester may be determined in any of the ways described above. If true, the server requests the file from the provider and sends the file to the requester. Alternately, the provider may send the file directly to the requester.

Figure 15:
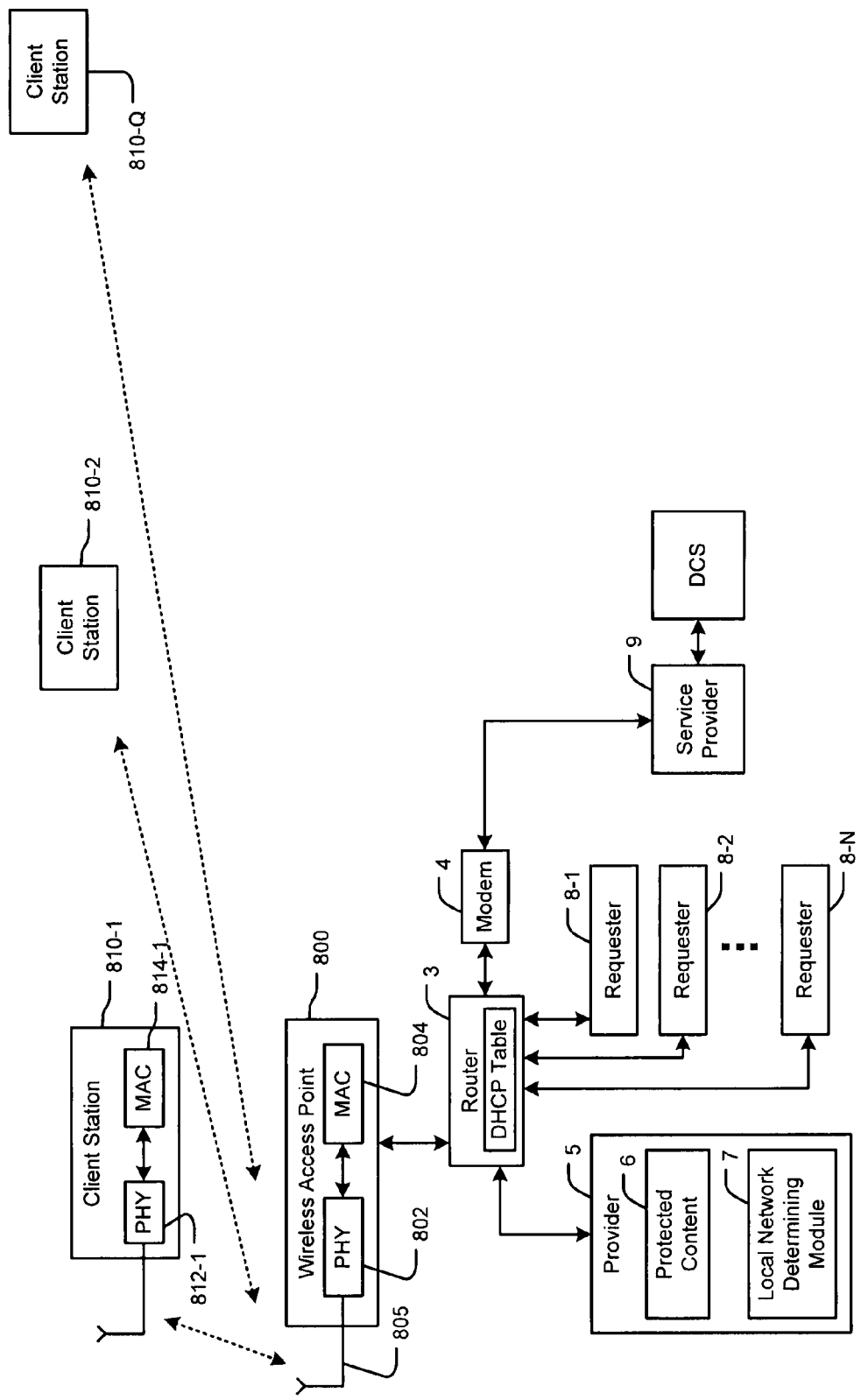
FIG. 15 is a functional block diagram of a provider network device that determines a local/remote status of a wireless network device such as a client station.

Referring now to FIG. 15, a provider network device 5 determines a local/remote status of a wireless network device that is requesting protected content. The provider network device 5 may communicate with an access point 800 via the router 3. The access point 800 may include a physical layer (PHY) device 802, which provides an interface with the wireless medium, and a medium access control (MAC) device 804, which provides an interface between the physical layer device 802 and a host device.

The physical layer device 802 may determine at least one of a link speed of a link with a client station, a signal quality of a link with the client station, a link distance to the client station and/or a link direction to the client station. The wireless access point 800 includes an antenna system 805 that may include one or more antennas. For example, the antenna system may be a multiple-in, multiple out (MIMO) antenna system. If multiple antennas are used, the physical layer device 802 may selectively determine a direction that the client station is located with respect to the access point 800 and forward the direction information to the provider network device 5. The physical layer device 802 may determine the direction based on triangulation techniques and/or using other approaches.

For example, the wireless network device may include a client station 810-1. The client station 810-1 includes a physical layer (PHY) device 812-1, which provides an interface with the wireless medium. The client station 810-1 also includes a medium access control (MAC) device 814-1, which provides an interface between the physical layer device 812-1 and a host such as a laptop, personal digital assistant and/or any other suitable device. Additional client stations 812-2 and 812-3 (collectively client stations 812) also may establish wireless links with the wireless access point 800. The wireless access point 800 may also determines link speed, signal quality, link distance and/or link direction with the client stations 812-2 and 812-3 when they request access to protected content.

The wireless access point 800 may selectively transmit the link speed, signal quality, link distance and/or link direction for the corresponding client stations 810 to the local network determining module 7. The local network determining module 7 compares the link speed, signal quality, link distance and/or link direction with a predetermined threshold and/or adaptive threshold and makes a decision as to whether the particular client station 810 is local or remote. If the client station 810 is local, the protected content may be sent to the client station 810 as described above. If the client station 810 is remote, the protected content is not sent to the client station 810 and/or further verification steps may be performed.

The link speed and/or signal quality of the link between the wireless access point 800 and the client station 810 tends to decrease as a function of a distance between the wireless access point 800 and the client station 810. Therefore, when the client station 810 requests access to protected content (requester network device), the provider network device can evaluate whether the client station is local or remote. Thus, the provider network device 5 can limit fraudulent requests for the protected content. While the exemplary embodiment shown in FIG. 15 relates to an infrastructure mode wireless network, an ad-hoc mode wireless network can also be used.

Figure 17:
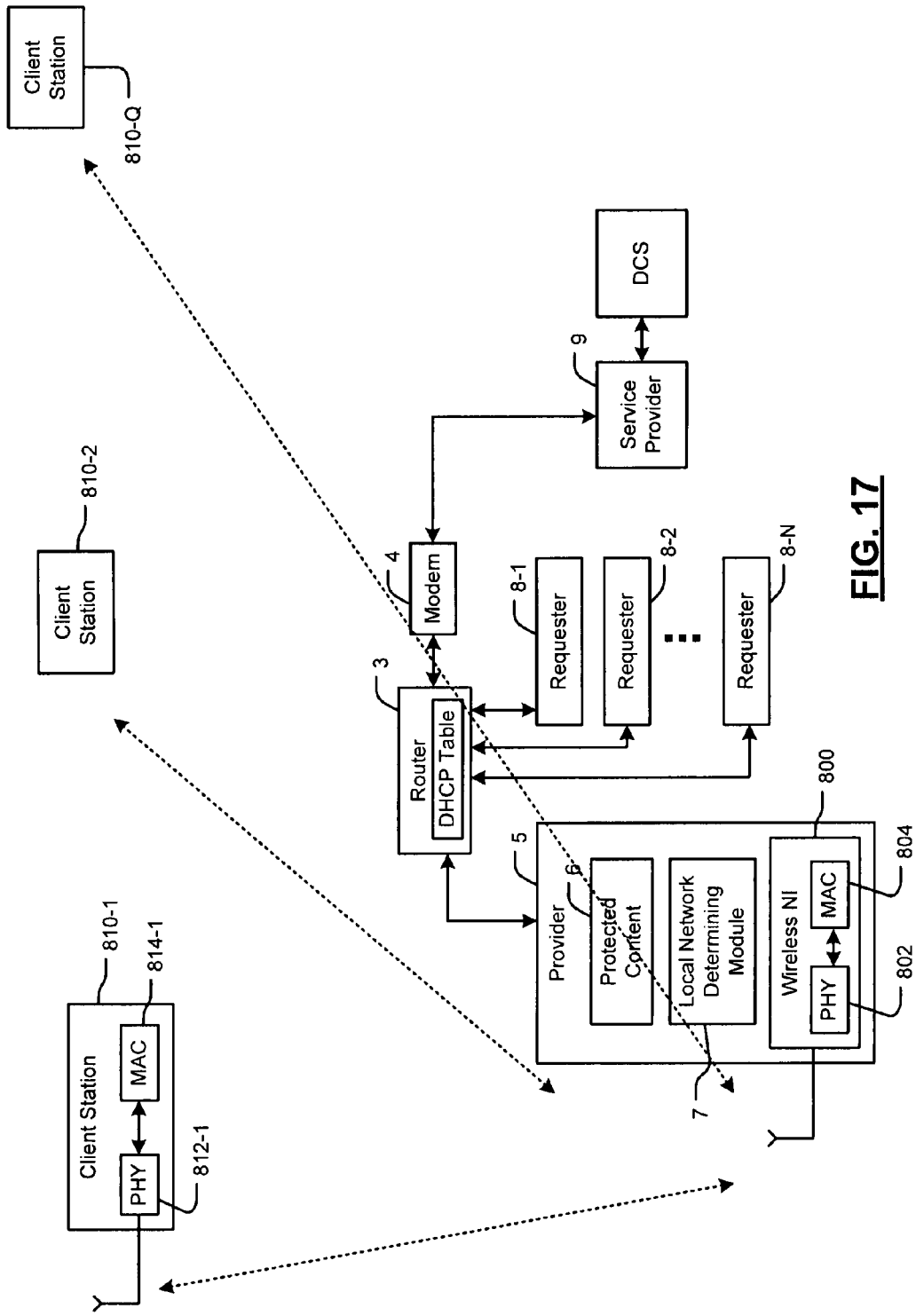
FIG. 17 is a functional block diagram of a provider network device that includes a wireless network interface.

Referring now to FIG. 17, the provider network device 5 can include a wireless network interface 850, which includes a physical layer device 852 and a medium access control (MAC) device 854. The wireless network interface 850 can operate as an access point/router in an infrastructure mode, as a client station in an ad-hoc configuration, and/or in any other suitable network configuration.

Figure 16C:
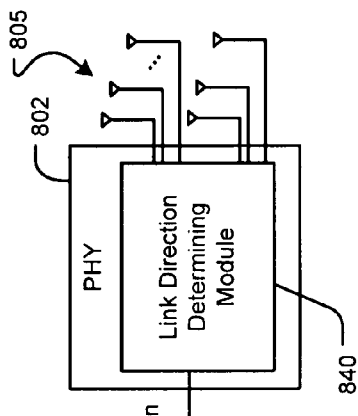
FIGS. 16A-16E are functional block diagrams of a physical layer device of a wireless network device such as an access point or wireless network interface.
Figure 16B:
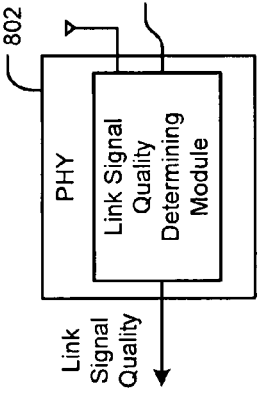
Figure 16A:
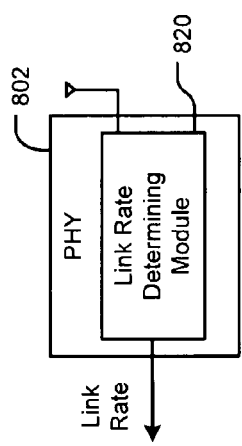

FIGS. 16A-16E are functional block diagrams of exemplary physical layer devices for wireless network devices such as an access point or wireless network interface. The physical layer device 802 may include a link rate determining module 820 as shown in FIG. 16A. The link rate determining module 820 determines the link rate that data is transmitted by the client station 810 to the access point 800 and forwards the link rate information to the provider network device 5. The physical layer device 802 may include a link signal quality determining module 830 as can be seen in FIG. 16B that estimates the signal quality of the link and forwards the signal quality information to the provider network device. Signal quality can be estimated based on a received signal strength indicator (RSSI), bit or packet error rates and/or other suitable criteria.

In FIG. 16C, the physical layer device 802 may include a link direction determining module 840. The link direction determining module 840 may use triangulation (for example using multiple antennas) and/or other techniques to determine a direction that the client station is located relative to the physical layer device 802. The physical layer device 802 forwards the link direction information to the local network determining module 7. For example, the access point may be located adjacent to an outer wall of a building. If a client station 810 is located in a direction that would be inside of the building, then additional speed, distance and/or signal quality determinations can be made to determine whether the client station is local or remote. However, if the client station 810 is located in a direction that would be outside of the building, the client station 810 can be classified as remote without further analysis. The link direction, link distance, link signal quality and/or link data rate estimates can also be estimated in the medium access control (MAC) device of the access point, network interface and/or in the provider network device.

Figure 16E:
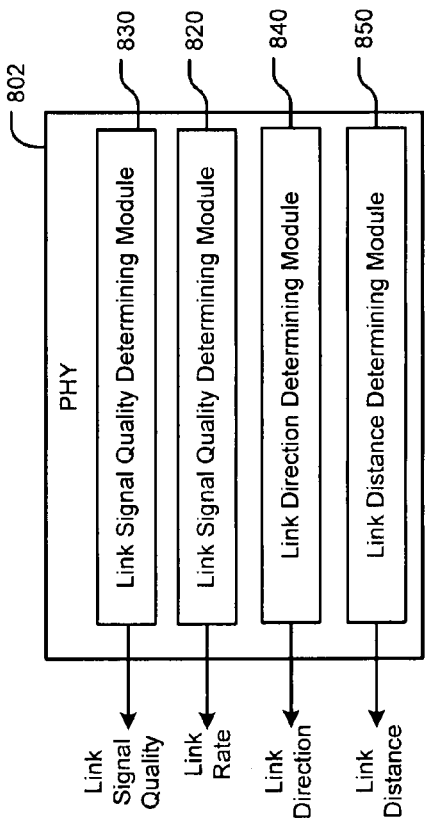
Figure 16D:
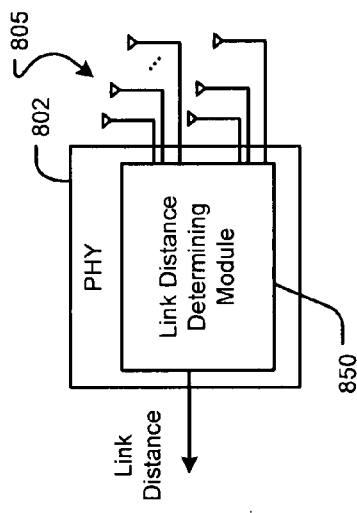

In FIG. 16D, the physical layer device 802 may include a link distance determining module 850 that estimates a distance to the client station 810. The distance may be estimated based on the amount of time required to send and/or receive data between the access point 800 and client station 810.

In FIG. 16E, the physical layer device may generate 802 two or more of the link direction, link speed, link distance and link signal quality estimates. The provider network device may determine a local/remote status based on two or more of the estimates.

Figure 18A:
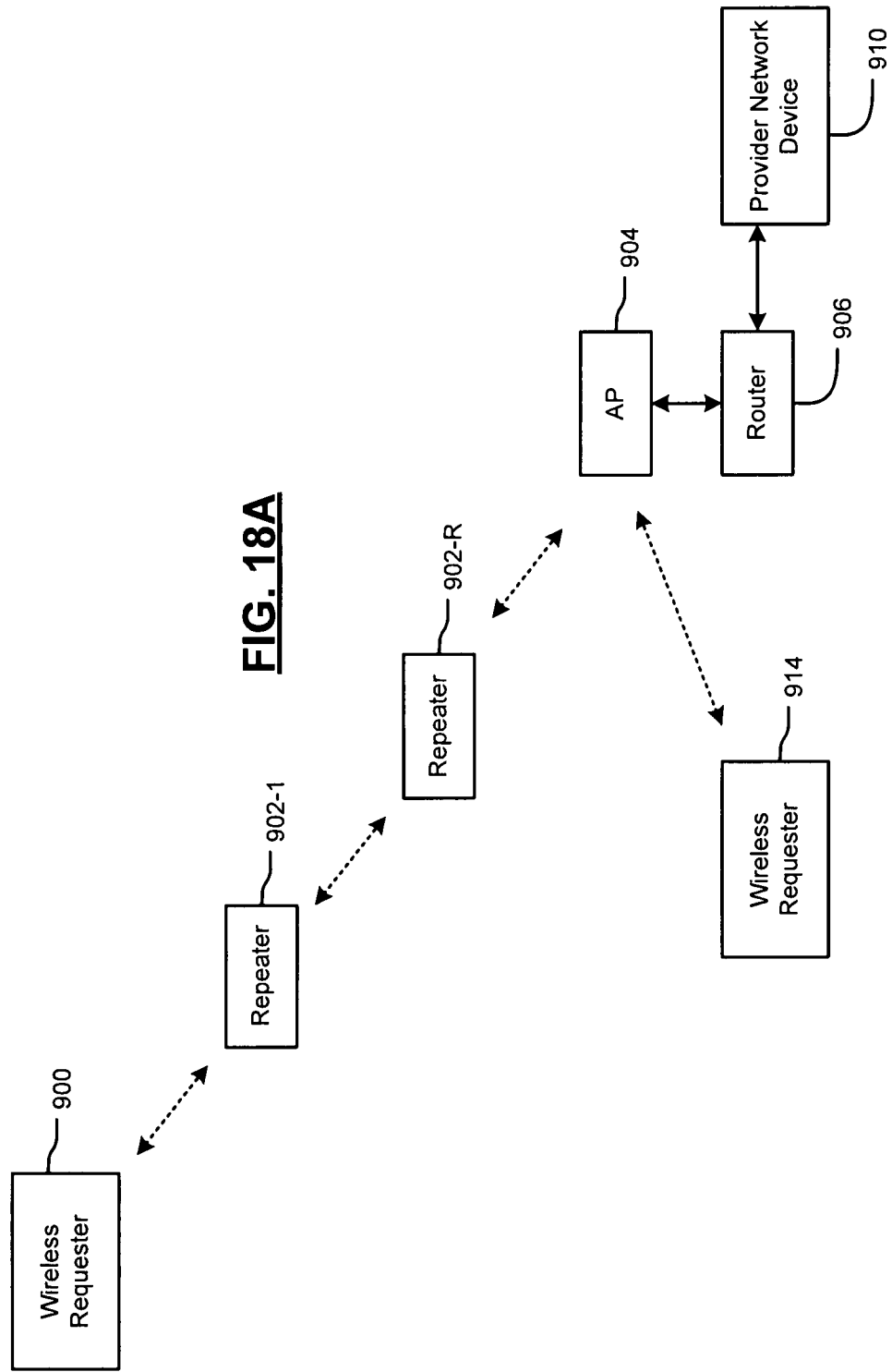
FIG. 18A is a functional block diagram of a requester wireless network device that communicates with a provider network device via one or more repeaters.
Figure 18B:
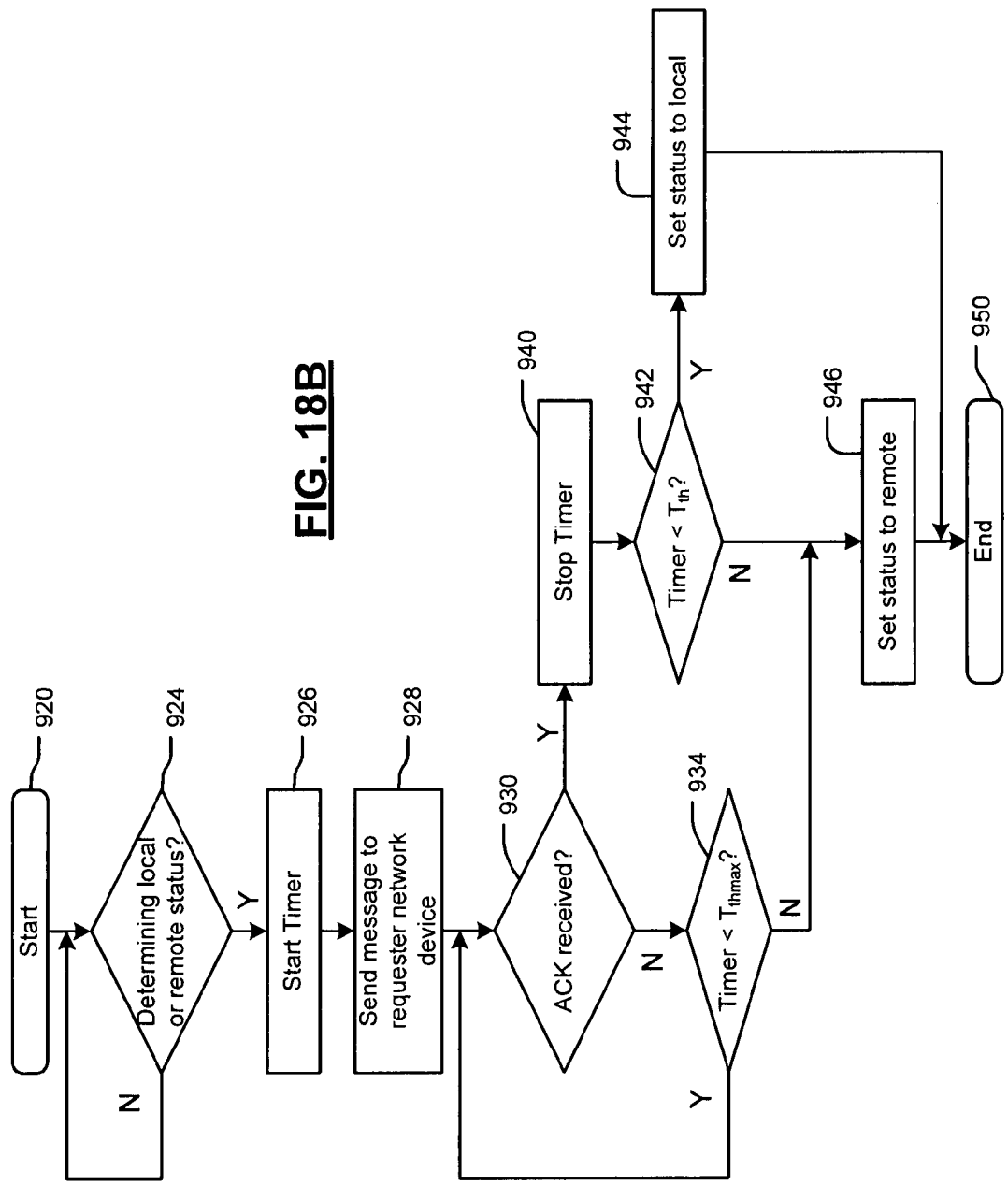
FIG. 18B is a flowchart illustrating steps of an exemplary method for identifying whether a requesting wireless network device is communicating via one or more repeaters.

Referring now to FIGS. 18A and 18B, the provider network device may determine the local/remote status of a requesting wireless network device by determining whether the signal from the requesting wireless network device was received via a repeater and/or more than R repeaters, where R is an integer greater than one. The use of one or more repeaters may be an indication that the requesting wireless network device does not have a local status.

In FIG. 18A, a requester wireless network device 900 communicates with a provider network device 910 via one or more repeaters 902-1, . . . , and 902-R, where R is an integer greater than 0. In this exemplary implementation, the provider network device 910 communicates with the requesting wireless network device 900 in an infrastructure mode via an access point 904 and a router 906. However, an ad-hoc mode may also be used. The provider network device 910 determines whether the requester network device is communicating via one or more repeaters and/or the number of repeaters that are being used. The provider network device 910 determines a local/remote status of the requester network device based on the repeater determination.

For example, some provider network devices may determine that the requester network device is remote if any repeaters are used. In other exemplary networks, the provider network device may determine the requester network device is remote if more than R repeaters are used, where R is greater than one. The provider network device 910 may sense whether repeaters are used using any suitable method. For example. The provider network device may use a time required for acknowledgement (ACK) from the requester network device as one criterion.

In FIG. 18B, is a flowchart illustrating steps of an exemplary method for identifying whether a requesting wireless network device is communicating via one or more repeaters. Control begins with step 920. In step 924, control determines whether the local or remote status of a requester network device needs to be determined. If true, control continues with step 926 and starts a timer.

In step 928, control sends a message to a requester network device. In step 930, control determines whether an acknowledgment (ACK) has been received from the requester network device. If not, control determines whether the timer is less than a maximum threshold $T_{thmax}$ in step 934. If true, control returns to step 930. It step 930 is true, control stops the timer in step 940. In step 942, control determines whether the timer is less than a second threshold $T_{th}$. If true, control continues with step 944 and sets the status equal to local for the requester network device. It step 942 is false or step 934 is false, control continues with step 946 and sets the status of the requester network device equal to remote. Control ends in step 950.

Figure 19:
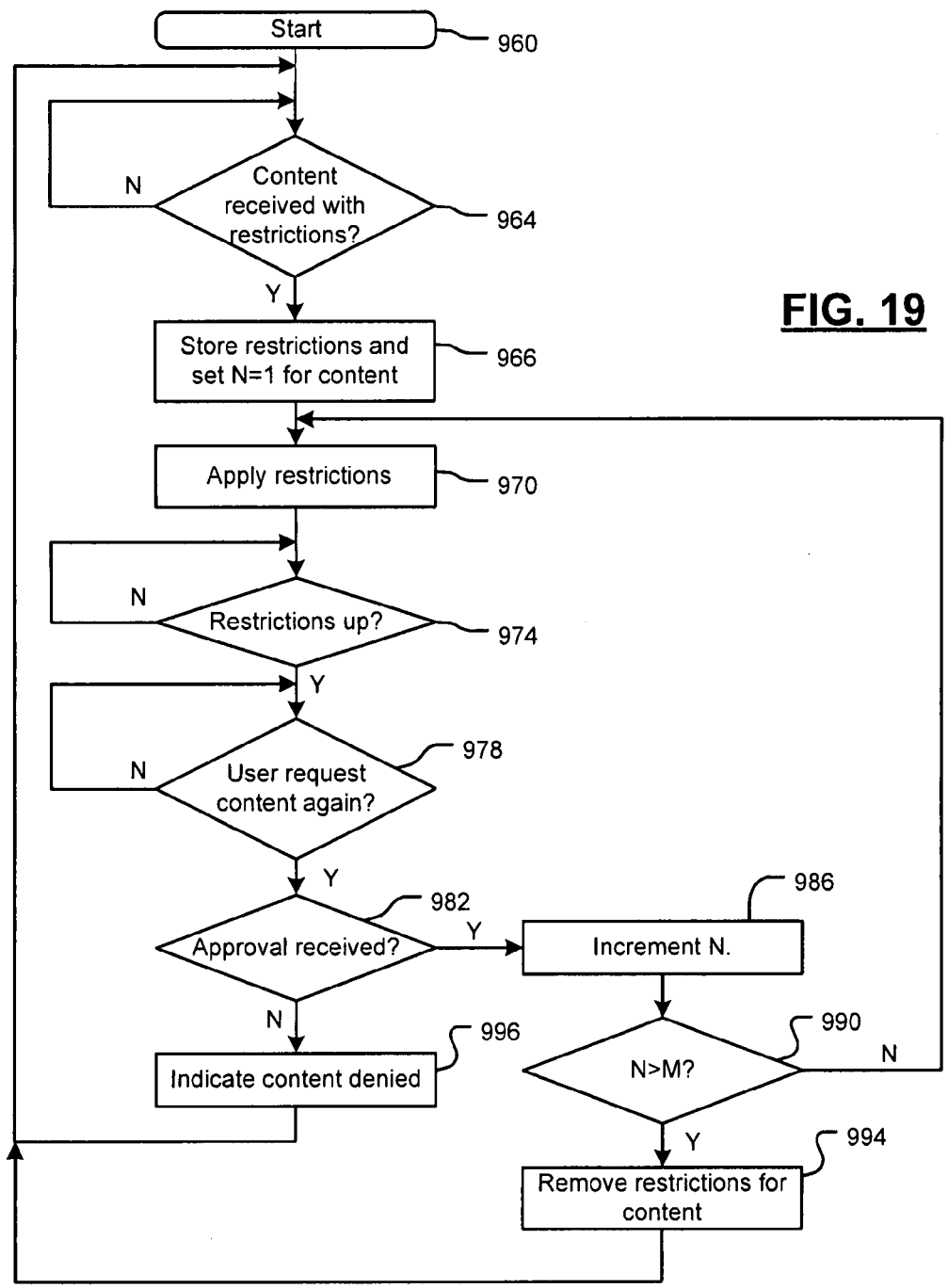
FIG. 19 is a flowchart illustrating steps performed by a requester network device for selectively removing restrictions.

Referring now to FIG. 19, steps of the method for operating the requester network device are shown. The requester network device may initially request access to content that may be rented by a provider network device. When the restrictions relating to the content expire at the requester network device, the requester network device may request access to the content again. If the provider network device grants access M times, where M is an integer greater than or equal to 2, it may be fair to assume that the provider network device now has ownership of the content and unlimited access by the requester network device may be acceptable.

Control begins with step 960. In step 964, control determines whether the requester network device has received content with restrictions. If step 964 is true, control continues with step 966 and stores the restrictions. Control sets a counter N=1. In step 970, control applies the restrictions. In step 974, control determines whether the restrictions have expired. If false, control returns to step 974. Otherwise, control continues with step 978 and determines whether the user requests the same content again. If not, control returns to step 978. If step 978 is true, control determines whether the requester network device receives approval. If true, control increments N in step 986. In step 990, control determines whether N is greater than or equal to M, where M is an integer greater than or equal to 2. If step 990 is false, control returns to step 970 continues to apply the restrictions. In step 990 is true, control continues with step 994 and removes the restrictions for the content.

Figure 20A:
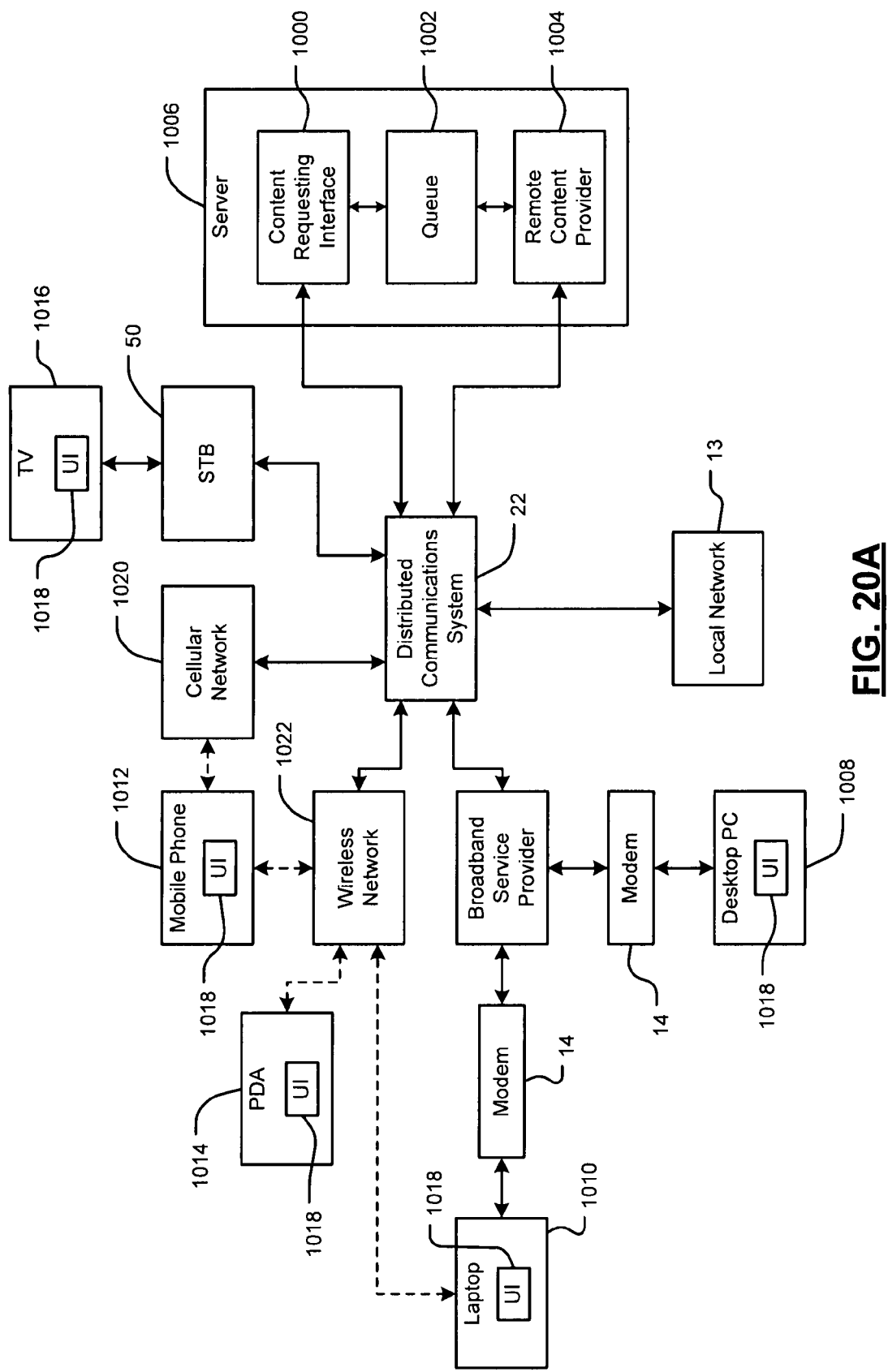
FIGS. 20A-20D are functional block diagrams of a network including a content requesting interface.

Referring now to FIG. 20A, a content requesting interface 1000 can be used to request and queue desired protected content. The desired protected content is added to a queue 1002 and delivered from a remote storage location, such as a remote content provider 1004.

The content requesting interface 1000 may include, but is not limited to, an interface such as an Internet website (or other DCS) located on a server 1006. A user of the local network 13 may select (and browse) desired protected content from available content at the content requesting interface 1000. In other words, the user may access the content requesting interface 1000 with devices including, but not limited to, a desktop personal computer (PC) 1008, a laptop PC 1010, a mobile phone 1012, a personal digital assistant (PDA) 1014, and a television 1016. Each of the devices may include a user interface (UI) 1018 for remotely interacting (via a wired or wireless medium) with the content requesting interface 1000. For example, the UI 1018 may include, but is not limited to, a web browser or another remote browsing interface. The content requesting interface 1000 may employ login procedures (e.g. usernames and/or passwords).

The desktop PC 1008 may be connected to the content requesting interface 1000 via a modem 14, a broadband service provider 18, and a DCS 22. Similarly, the laptop PC 1010 may be connected to the content requesting interface 1000 via a modem 14, the broadband service provider 18, and the DCS 22. The mobile phone 1012 may be connected to the content requesting interface 1000 via a cellular network 1020 (and/or a wireless network 1022) and the DCS 22. The PDA 1014 may be connected to the content requesting interface 1000 via the wireless network 1022 and the DCS 22. The TV 1016 may be connected to the content requesting interface 1000 via an STB 50 and the DCS 22.

When the user of the local network 13 selects desired protected content (i.e. selected content) via the content requesting interface 1000 using the UI 1018 of one of the devices, the selected content is added to the queue 1002 for that user. For example, the queue 1002 may store an identifier of the selected content rather than an entire file including the selected content. In the present implementation, the queue 1002 (i.e. the stored contents of the queue) is stored on the server 1006. In other implementations, the queue 1002 may be stored at another remote location such as another remote computer or server connected to the DCS 22 (as shown in FIGS. 2-5) and/or at the local network 13.

The selected content may be added to the queue 1002 based on user interaction with the content requesting interface 1000 and/or via interaction with the local network 13. The local network 13 may incorporate (e.g. provide access to) the content requesting interface 1000. The queue 1002 may be integrated with, stored on, and/or in communication with the remote content provider 1004 or the local network 13. The user may view contents of the queue 1002, delete selections from the queue 1002, and change a sequence of the selected contents of the queue 1002 via the content requesting interface 1000.

The remote content provider 1004 sequentially and asynchronously (i.e. not on demand) provides the selected content in the queue 1002 to the local network 13 via the DCS 22. For example, the remote content provider 1004 may include memory that stores all of the content available (i.e. selectable) to the user. In the present implementation, the remote content provider 1004 is located on the server 1006. In other implementations, the remote content provider may be located on another remote server or a local server. The remote content provider 1004 remotely caches and distributes the selected content to the local network 13 in an order that the user selected the content (e.g. in a first in first out manner) based on the queue 1002. In other words, the remote content provider 1004 does not provide the selected content at the same time that the user makes the request (i.e. on demand) but instead caches and delivers the selected content to the local network based on the queue 1002.

The remote content provider 1004 sequentially delivers the selected content to the local network 13 based on the contents of the queue 1002 as described above. The delivered content is accessible to the user of the local network 13 as previously described with respect to FIGS. 1-14. For example, the delivered content may be viewable a certain number of times or for a particular amount of time. Alternatively, there may be no limitations on terms of use of the delivered content. Certain selected content may be transferable to a DVD or other transportable (i.e. removable) digital or other storage medium based on an agreement between the user of the local network and the remote content provider 1004.

Hence, the remote content provider 1004 selectively and sequentially delivers the selected content to the local network 13 based on the contents of the queue 1002. In particular, the remote content provider 1004 delivers the selected content asynchronously with respect to user requests (i.e. not on demand). For example, the remote content provider 1004 may deliver a next selection in the queue 1002 after a previously delivered selection is viewed a predetermined number of times or for a predetermined period (e.g. one week after the previously delivered selection is viewed). In another implementation, a viewed selection may be automatically erased from the local network 13, moved to a hidden section of the local network 13, or otherwise made unusable by the user after a period of time. The next selection in the queue 1002 is delivered to the local network 13 when the previously viewed selection is erased.

The user of the local network 13 may erase the viewed selection at any time and indicate that the viewed selection is erased at the content requesting interface 1000. The remote content provider 1004 may search the local network to determine whether the indicated selection is erased and subsequently deliver the next selection. The remote content provider 1004 may continuously or periodically check the local network 13 for presence of the delivered content notwithstanding any action taken by the user. Alternatively, the local network 13 can send a message to the remote content provider 1004 indicating that the previously delivered selection is erased. The remote content provider 1004 automatically delivers the selected content when the remote content provider 1004 determines that the previously delivered selection is erased.

The remote content provider 1004 may deliver the selected content based on status of received selected content on the local network 13. For example, the remote content provider may deliver the selected content based on a number of delivered selections located on the local network 13. The user of the local network 13 may be permitted to possess a certain number of delivered selections at a given time (e.g. three selections). The remote content provider 1004 will not deliver any of the selected content in the queue 1002 until the number of delivered selections on the local network 13 is less than the permitted number. When the user erases any of the received selected content (i.e. the previously delivered content), the remote content provider 1004 automatically delivers additional selected content based on the queue 1002. For example, when the user erases two received selected content, the remote content provider 1004 automatically delivers the next two selections in the queue 1002.

The selected content in the queue 1002 may be automatically delivered to the local network 13 when queued at the content requesting interface 1000. The delivered content is cached at the local network 13 and is not initially accessible (e.g. visible and/or usable) to the user. For example, the delivered content may be stored to a hidden section of the HDD 34 as described in FIG. 2. The user may be unaware that the delivered content is being stored on the HDD 34. Alternatively, the delivered content may be visible to the user, but unusable (i.e. inaccessible). When any previously viewed content is erased, the delivered content becomes available to the user based on the sequence of the content in the queue 1002. For example, the remote content provider 1004 may communicate with the local network 13 to make the delivered content accessible (e.g. to move the content from the hidden section to the user accessible section of the HDD 34 as described in FIG. 2). In this manner, the user of the local network 13 does not have to wait for the remote content provider 1004 to deliver the selected content from the queue 1002 when other criteria are met (e.g. when access to the delivered content is otherwise permitted based on the number of permitted selections).

The asynchronous delivery of the selected content may also implement load balancing. For example, the remote content provider 1004 may deliver the selected content to the local network 13 during specific low traffic periods. In one implementation, the remote content provider 1004 delivers the selected content to the local network 13 during a specific time period (e.g. a known low traffic time period) or when traffic is below a threshold. Initially, the selected content is stored to the hidden section of the HDD 34. When any previously viewed content is erased, the delivered content becomes available to the user based on the sequence of the content in the queue 1002.

Figure 20B:
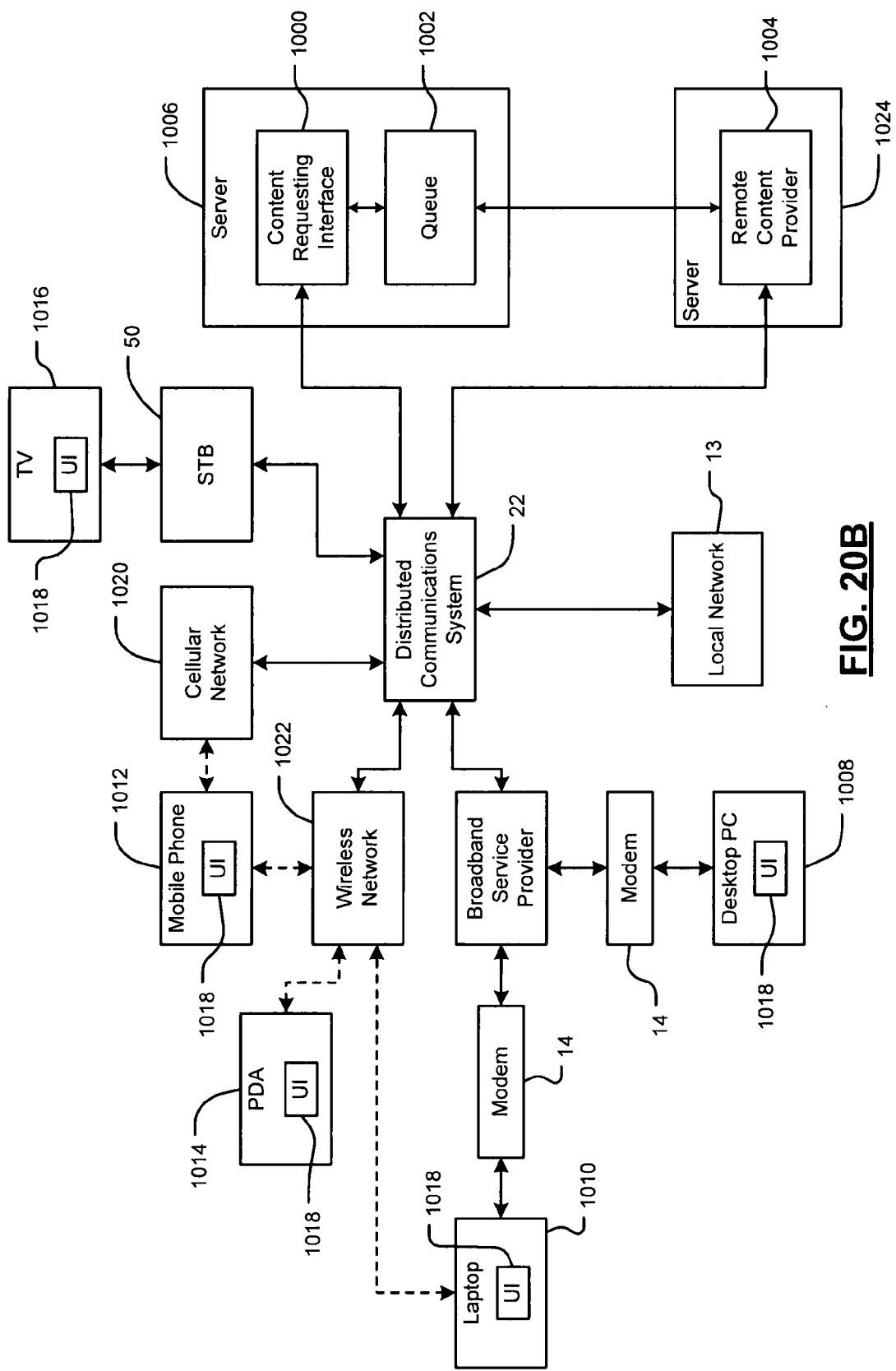
Figure 20C:
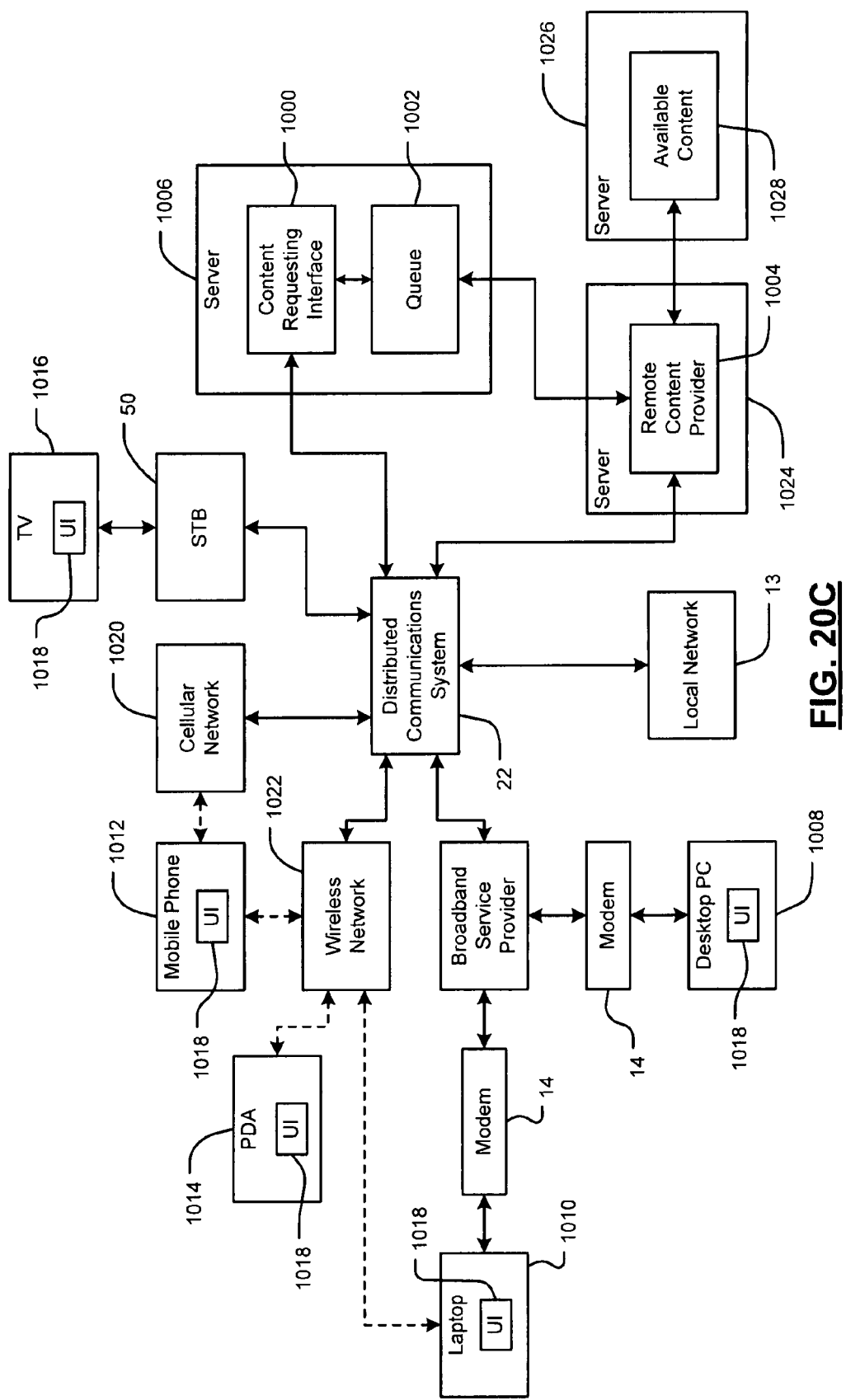
Figure 20D:
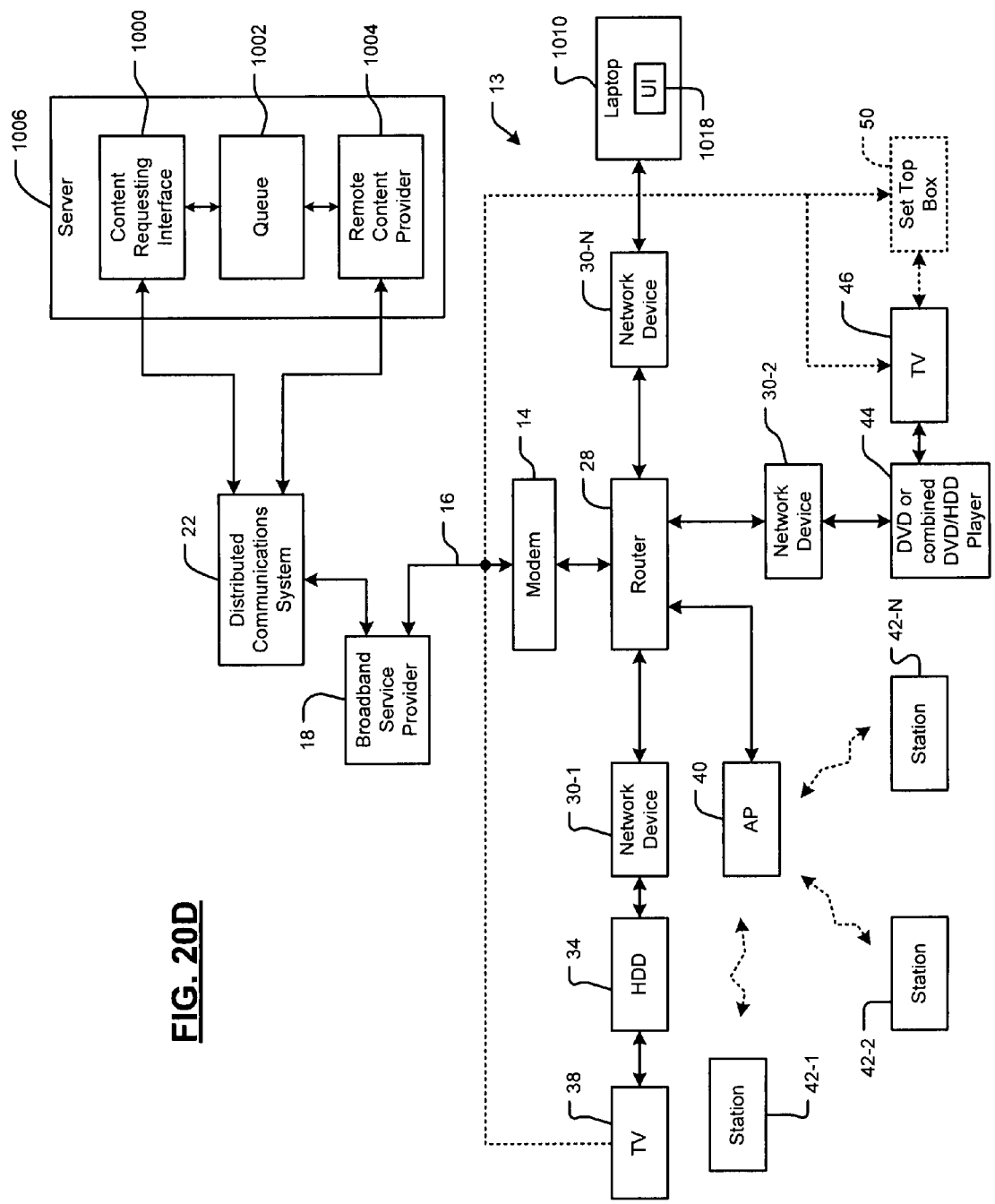

Referring now to FIGS. 20B-20D, other implementations of the content requesting interface 1000 are shown. As shown in FIG. 20B, the content requesting interface 1000 and the queue 1002 are located on the server 1006. The remote content provider 1004 is located on another server 1024. For example, the server 1024 may be a local server that is located closer to the local network 13.

As shown in FIG. 20C, a server 1026 stores available content 1028. When the selected content is added to the queue 1002, the selected content is transmitted to the remote content provider 1004 from the available content 1028 on the server 1026. For example, the remote content provider 1004 may send a request for selected content to the server 1026 based on the contents of the queue 1002. In other words, the remote content provider 1004 does not store all of the available content 1028 and instead stores only the selected content.

As shown in FIG. 20D, the user may access the content requesting interface 1000 via the local network 13. For example, the user may access the content requesting interface 1000 via the use interface 1018 of the laptop PC 1010. The laptop PC 1010 is connected to the content requesting interface 1000 via the network device 30-N.

As described above with respect to FIGS. 20A-20D, the content requesting interface 1000 is shown to asynchronously (i.e. asynchronously with respect to user requests) deliver selected content to the local network 13 based on the contents of the queue 1002. Those skilled in the art can appreciate that the selected content may be delivered synchronously in certain situations. For example, when the queue 1002 is empty and there are no received selected content (or less than the permitted number of selections) present on the local network 13, a particular selection may be delivered immediately when the user adds the selection to the queue 1002.

Those skilled in the art can appreciate that other network configurations such as those described herein, as well as other network configurations, are contemplated.

Figures 21A, 21B:
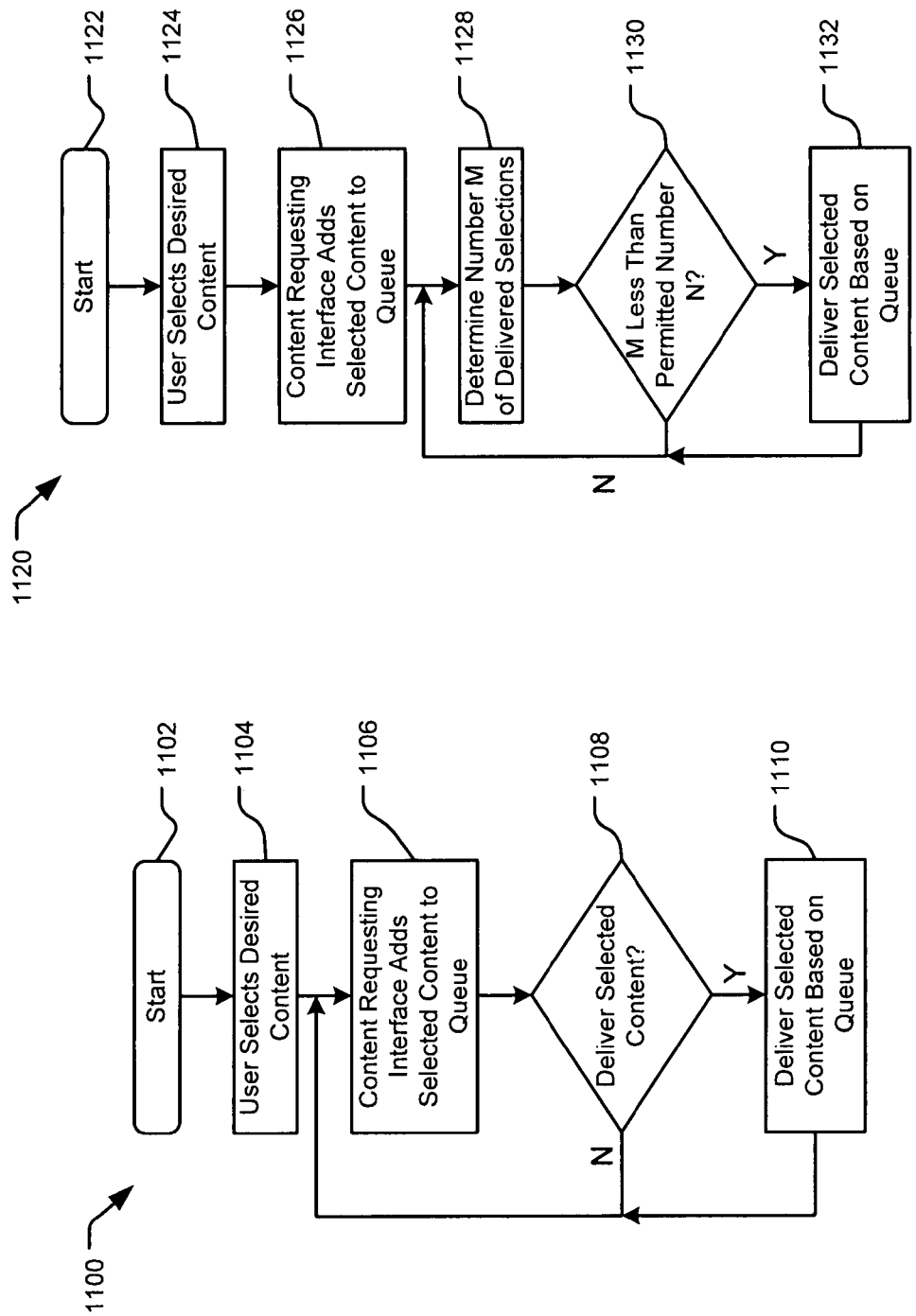
FIGS. 21A-21E are flowcharts illustrating steps of exemplary methods for delivering selected content.

Referring now to FIGS. 21A-21E, various methods for delivering selected content are described. Referring now to FIG. 21A, a method 1100 for delivering selected content begins in step 1102. The user of the local network 13 selects desired content in step 1104. The desired content is added to the queue 1002 in step 1106. The remote content provider 1004 determines whether the selected content is ready (e.g. permitted) to be delivered to the local network 13 in step 1108. For example, the remote content provider 1004 may determine whether a number of delivered selections on the local network 13 is less than a maximum permitted number of selections. If true, the method 1100 continues to step 1110. If false, the method 1100 continues to step 1108. In step 1110, the remote content provider 1004 delivers (or otherwise makes accessible) the selected content to the local network 13 based on a sequence of the selected content in the queue 1002.

Referring now to FIG. 21B, a method 1120 for delivering selected content begins in step 1122. The user of the local network 13 selects desired content in step 1124. The content requesting interface 1000 adds the desired content to the queue 1002 in step 1126. The remote content provider 1004 determines a number M of delivered selections M that are present on the local network 13 in step 1128. For example, the remote content provider 1004 continuously or periodically searches the local network 13 to determine M (e.g. to determine whether received selected content was erased). In another implementation, the local network 13 determines the number of delivered selections M. The remote content provider 1004 determines whether M is less than a permitted number N of delivered selections in step 1130. If true, the method 1120 continues to step 1132. If false, the method 1120 continues to step 1128. In step 1132, the remote content provider 1004 delivers the next selection of the selected content to the local network 13 based on a sequence of the selected content in the queue 1002.

Figure 21D:
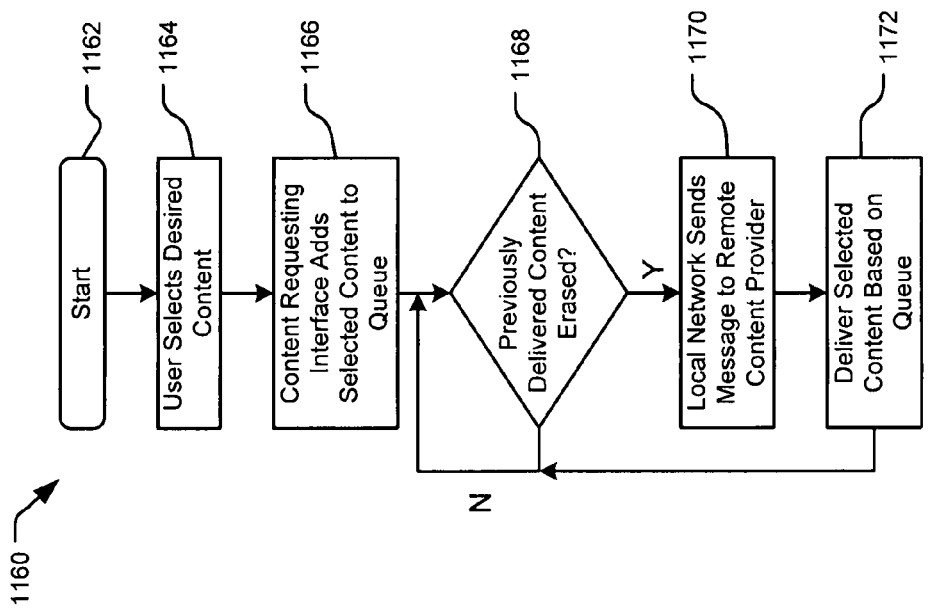
Figure 21C:
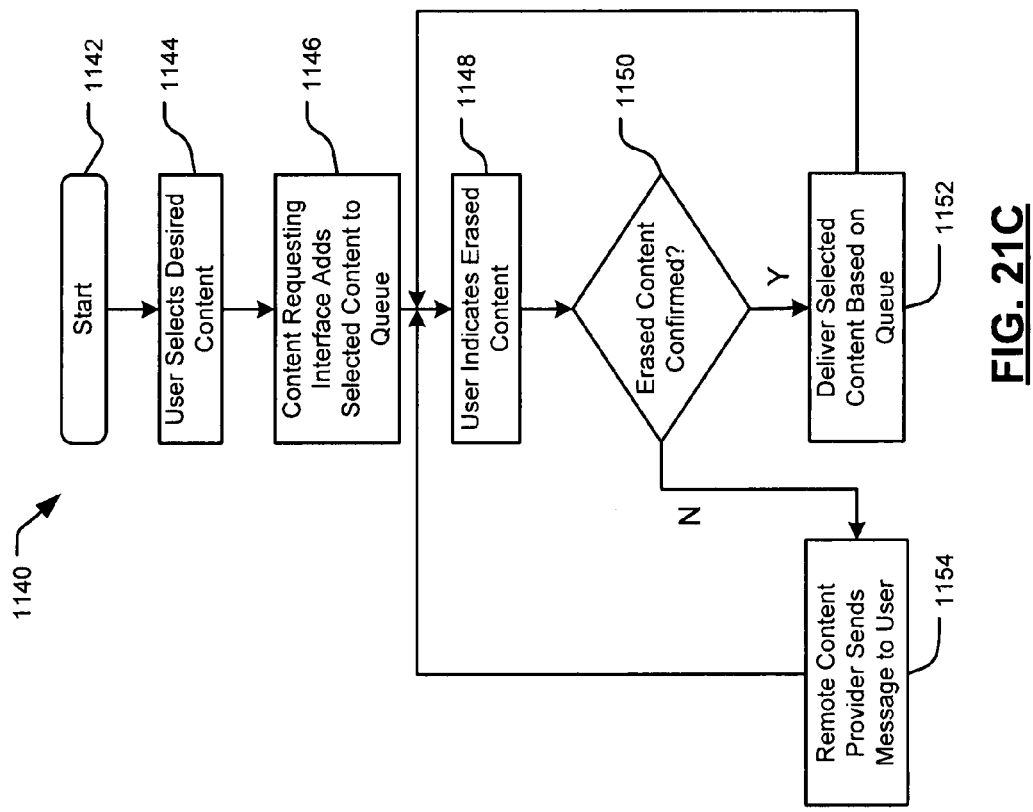

Referring now to FIG. 21C, a method 1140 for delivering selected content begins in step 1142. The user of the local network 13 selects desired content in step 1144. The desired content is added to the queue 1002 in step 1146. The user indicates that received selected content was erased at the content requesting interface 100 in step 1148. The remote content provider 1004 determines whether the received selected content was erased in step 1150. In other words, the remote content provider 1004 attempts to confirm that the received selected content was erased. If true, the method 1140 continues to step 1152. If false, the method 1140 continues to step 1154. In step 1152, the remote content provider 1004 delivers the next selection of the selected content to the local network 13 based on a sequence of the selected content in the queue 1002. In step 1154, the remote content provider 1004 sends a message to the user indicating that the received selected content was not erased. For example, the remote content provider 1004 may send a message to the content requesting interface 1000 indicating that the user needs to erase the received selected content.

Referring now to FIG. 21D, a method 1160 for delivering selected content begins in step 1162. The user of the local network 13 selects desired content in step 1164. The desired content is added to the queue 1002 in step 1166. The local network 13 determines whether received selected content was erased in step 1168. If true, the method 1160 continues to step 1170. If false, the method 1160 continues to step 1168. In step 1170, the local network 13 sends a message to the remote content provider 1004 that the received selected content was erased. In step 1172, the remote content provider 1004 delivers the next selection of the selected content to the local network 13 based on a sequence of the selected content in the queue 1002.

Figure 21E:
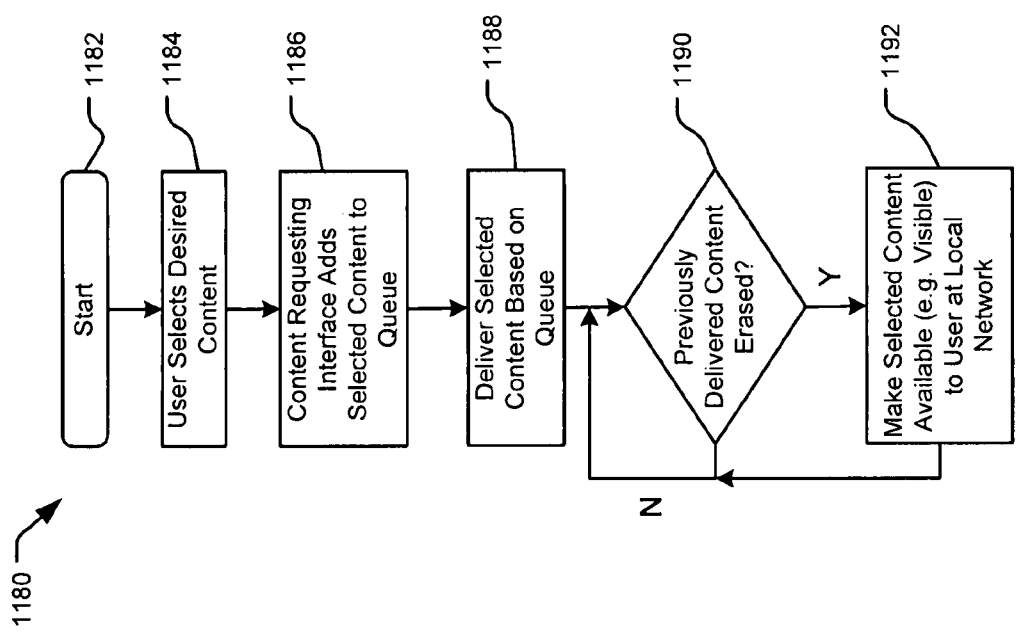

Referring now to FIG. 21E, a method 1180 for delivering selected content begins in step 1182. The user of the local network 13 selects desired content in step 1184. The desired content is added to the queue 1002 in step 1186. The remote content provider 1004 delivers one or more of the selections in the selected content to the local network 13 in step 1188. For example, the selected content may be stored in a hidden section of the HDD 34 as described in FIG. 2. The remote content provider 1004 (or the local network 13) determines whether any received selected content was erased in step 1190 (e.g. as described previously in FIGS. 21A-21D). If true, the method 1180 continues to step 1192. If false, the method 1180 continues to step 1190. In step 1192, the remote content provider 1004 or the local network 13 makes the delivered selected content on the local network 13 available to the user based on a sequence of the selected content in the queue 1002. For example, the local network 13 may move the selected content to a user accessible section of the HDD 34 as described in FIG. 2.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A network device, comprising:
   a content requesting interface for adding desired selected content to a queue associated with a remote content provider;
   memory that stores received selected content that is received from the remote content provider; and
   a network interface that:
      provides storage status data relating to the received selected content stored in the memory to the remote content provider;
      receives additional ones of the desired selected content in the queue from the remote content provider based on the storage status data of the received selected content in the memory; and
      stores the desired selected content received from the remote content provider as the received selected content in the memory,
   wherein the storage status data includes a hidden status and at least one of an erased status and an amount of the received selected content stored in the memory.

2. The network device of claim 1, wherein the network interface receives the additional ones of the desired selected content asynchronously with respect to a user request.

3. A system comprising the network device of claim 1 and further comprising the remote content provider.

4. The network device of claim 1, wherein the network interface provides usage data relating to the received selected content stored in the memory to the remote content provider,
   wherein the received selected content is stored in a hidden section of the memory, and
   wherein the received selected content becomes accessible to a user based on at least one of:
      a sequence of the desired selected content in the queue; and
      at least one of the usage data and the storage status data.

5. The network device of claim 4, wherein the received selected content stored in the hidden section of the memory has the hidden status.

6. The network device of claim 5, wherein the storage status data includes a period of time that the received selected content is stored in the memory.

7. The network device of claim 5, wherein the network interface receives the desired selected content when the received selected content is erased from the memory.

8. The network device of claim 1, wherein a user at least one of views the desired selected content, deletes the desired selected content, and modifies a sequence of the desired selected content in the queue using the content requesting interface.

9. The network device of claim 1, wherein the received selected content is at least one of erased from the memory and moved to a hidden section of the memory after at least one of a predetermined period and a predetermined number of viewings.

10. The network device of claim 9, wherein at least one of the network device and the remote content provider automatically erases the received selected content.

11. The network device of claim 1, wherein the network interface receives the desired selected content when a user of the network device indicates that the received selected content is erased.

12. The network device of claim 11, wherein the remote content provider determines whether the received selected content is erased.

13. The network device of claim 12, wherein the remote content provider periodically searches the memory to determine whether the received selected content is erased.

14. A system including the network device of claim 11 and the remote content provider, wherein the remote content provider:
   verifies that the received selected content is erased; and sends a next selection when erasing of the received selected content is verified.

15. The system of claim 14, wherein the remote content provider sends a message to at least one of the network device and the content requesting interface indicating that the received selected content has not been erased.

16. The network device of claim 1, wherein the received selected content is transferable to a removable storage medium based on an agreement between a user and the remote content provider.

17. The network device of claim 1, wherein an Internet website implements the content requesting interface.

18. A system comprising the network device of claim 1 and further comprising an optical data storage system.

19. A system comprising the network device of claim 1 and further comprising at least one of a hard disk drive (HDD) system and a solid-state memory device.

20. The network device of claim 1, wherein the network interface:
provides usage data relating to the received selected content stored in the memory to the remote content provider; and
receives additional ones of the desired selected content in the queue from the remote content provider based on the usage status data.

21. A system comprising a plurality of network devices of a local network, the system comprising the network device of claim 1 and the remote content provider, wherein:
each of the plurality of network devices receives the selected content from the network interface; and
the remote content provider determines a number of delivered selections of the selected content that are present on the local network.

22. The system of claim 21, wherein the remote content provider sends a next selection to the local network when the number of delivered selections is less than a permitted number.

23. A network device, comprising:
content requesting interface means for adding desired selected content to a queue associated with a remote content provider;
memory means for storing received selected content that is received from said remote content provider; and
network interface means for:
providing storage status data relating to the received selected content stored in the memory means to the remote content provider;
receiving additional ones of the desired selected content in the queue from the remote content provider based on the storage status data of the received selected content in the memory means; and
storing the desired selected content received from the remote content provider as the received selected content in the memory means,
wherein the storage status includes a hidden status and at least one of an erased status and an amount of the received selected content stored in the memory means.

24. The network device of claim 23, wherein the network interface means receives the additional ones of the desired selected content asynchronously with respect to a user request.

25. A system comprising the network device of claim 23 and further comprising at least one of the queue and the remote content provider.

26. The network device of claim 23, wherein the network interface means provides usage data relating to the received selected content stored in the memory means to the remote content provider,
wherein the received selected content is stored in a hidden section of the memory, and
wherein the received selected content becomes accessible to a user based on at least one of:
a sequence of the desired selected content in the queue; and
at least one of the usage data and the storage status data.

27. The network device of claim 26, wherein the received selected content stored in the hidden section of the memory has the hidden status.

28. The network device of claim 27, wherein the storage status of the received selected content includes a period of time that the received selected content is stored in the memory means.

29. The network device of claim 27, wherein the network interface receives the desired selected content when the received selected content is erased from the memory means.

30. The network device of claim 23, wherein a user at least one of views the desired selected content, deletes the desired selected content, and modifies a sequence of the desired selected content in the queue at the content requesting interface.

31. The network device of claim 23, wherein the received selected content is at least one of erased from the memory means and moved to a hidden section of the memory means after at least one of a predetermined period and a predetermined number of viewings.

32. The network device of claim 31, wherein at least one of the network device and the remote content provider automatically erases the selected content.

33. The network device of claim 23, wherein the network interface means receives the desired selected content when a user of the network interface indicates that the received selected content is erased.

34. The network device of claim 33, wherein the remote content provider determines whether the received selected content is erased.

35. The network device of claim 34, wherein the remote content provider periodically searches the memory means to determine whether the received selected content is erased.

36. The network device of claim 23, wherein the received selected content is transferable to a removable storage medium based on an agreement between a user and the remote content provider.

37. The network device of claim 23, wherein an Internet website implements the content requesting interface.

38. A system comprising the network device of claim 23 and further comprising an optical data storage system.

39. A system comprising the network device of claim 23 and further comprising at least one of a hard disk drive (HDD) system and a solid-state memory device.

40. A method for receiving selected content from a remote content provider at a network device, comprising:
adding desired selected content to a queue associated with the remote content provider;
storing received selected content that is received from the remote content provider in a memory;
providing storage status data relating to the received selected content stored in the memory to the remote content provider;

receiving additional ones of the desired selected content in the queue from the remote content provider based on the storage status data of the received selected content in the memory; and storing the desired selected content received from the remote content provider as the received selected content in the memory, wherein the storage status includes a hidden status and at least one of an erased status and an amount of the received selected content stored in the memory.

41. The method of claim 40, wherein the network device receives the desired selected content asynchronously with respect to a user request.

42. The method of claim 40, further comprising:
providing usage data relating to the received selected content stored in the memory to the remote content provider;
storing the received selected content in a hidden section of the memory; and
making the received selected content accessible to a user based on at least one of:
a sequence of the desired selected content in the queue; and
at least one of the usage data and the storage status data.

43. The method of claim 42, wherein the received selected content stored in the hidden section of the memory has the hidden status.

44. The method of claim 43, wherein the storage status includes a period of time that the received selected content is stored at the network device.

45. The method of claim 43, wherein the network device receives the desired selected content when the received selected content is erased from the network device.

46. The method of claim 40, wherein a user at least one of views the desired selected content, deletes the desired selected content, and modifies a sequence of the desired selected content in the queue at a content requesting interface.

47. The method of claim 46, wherein an Internet website implements the content requesting interface.

48. The method of claim 40, wherein the received selected content is at least one of erased from the network device and moved to a hidden section of the network device after at least one of a predetermined period and a predetermined number of viewings.

49. The method of claim 48, wherein at least one of the network device and the remote content provider automatically erases the received selected content.

50. The method of claim 40, wherein the network device receives the desired selected content when a user of the network device indicates that the received selected content is erased.

51. The method of claim 50, wherein the remote content provider determines whether the received selected content is erased.

52. The method of claim 51, wherein the remote content provider periodically searches the network device to determine whether the received selected content is erased.

53. The method of claim 41, wherein the received selected content is transferable to an optical data storage system based on an agreement between a user and the remote content provider.

* * * * *